Feb. 2, 1943. P. E. PEARSON 2,309,667
MACHINE FOR FORMING AND AFFIXING CENTER SPOTS TO CROWN CAPS
Filed Oct. 28, 1938 18 Sheets-Sheet 2
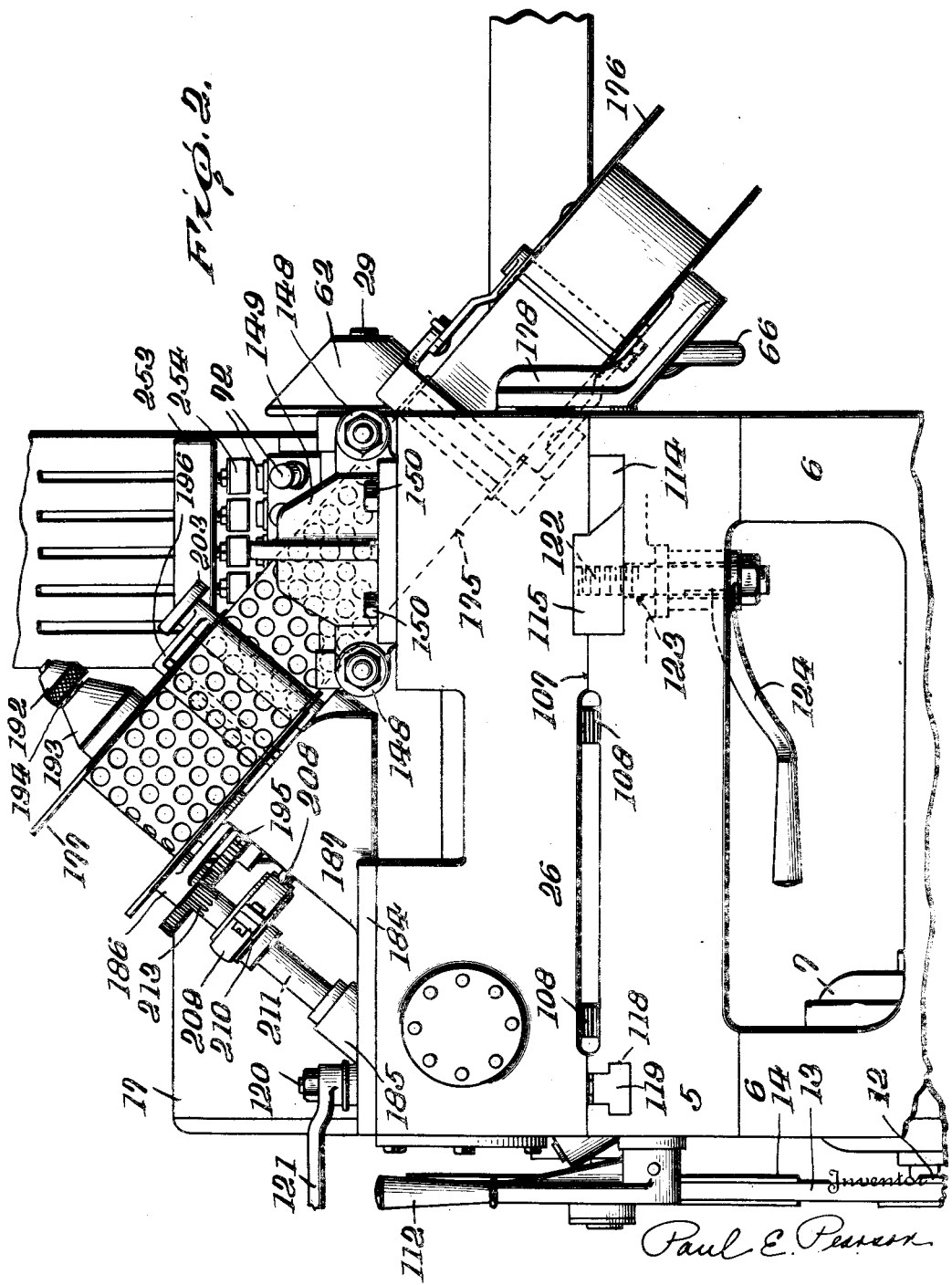
Inventor
Paul E. Pearson
By
Mason & Porter
Attorneys

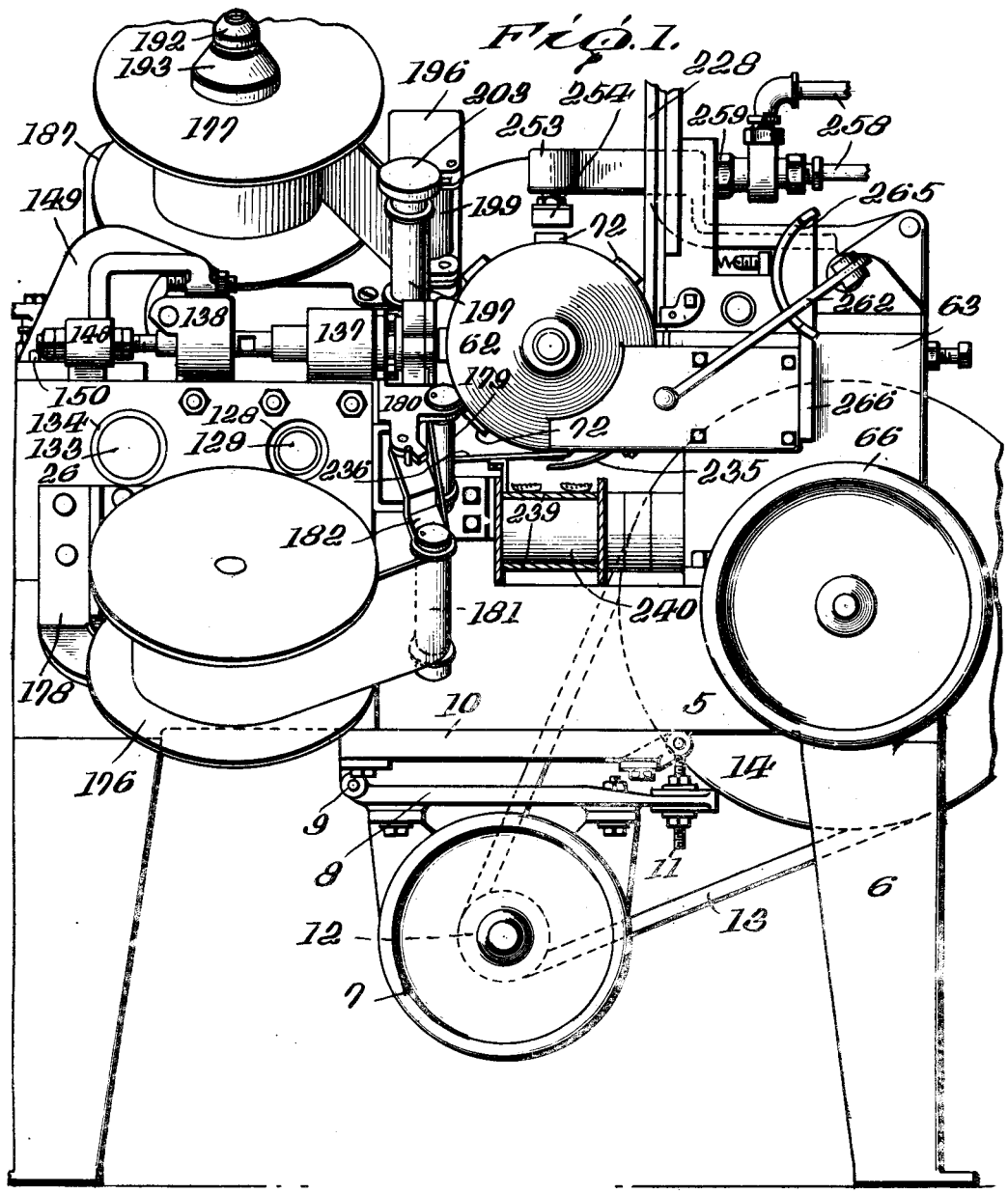

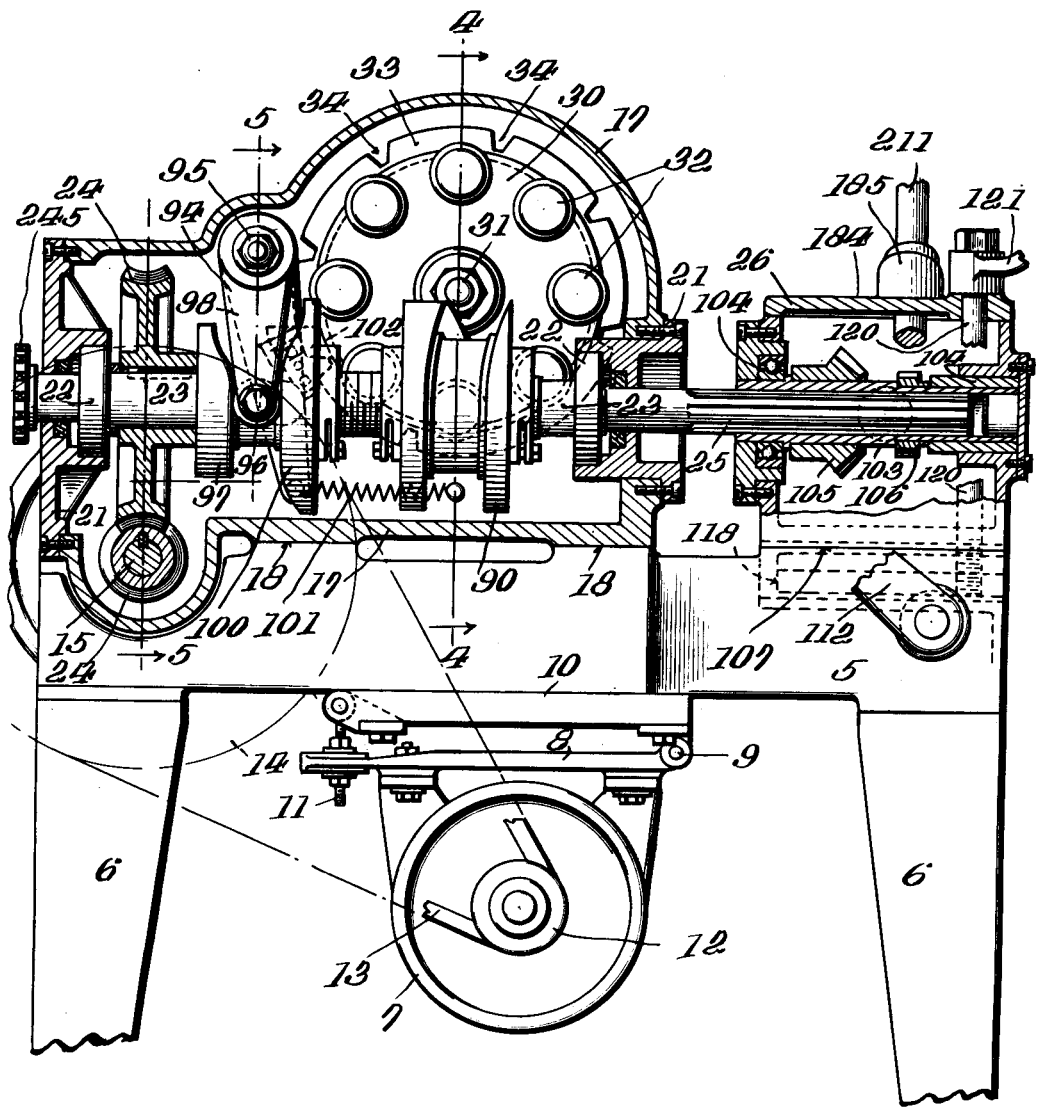

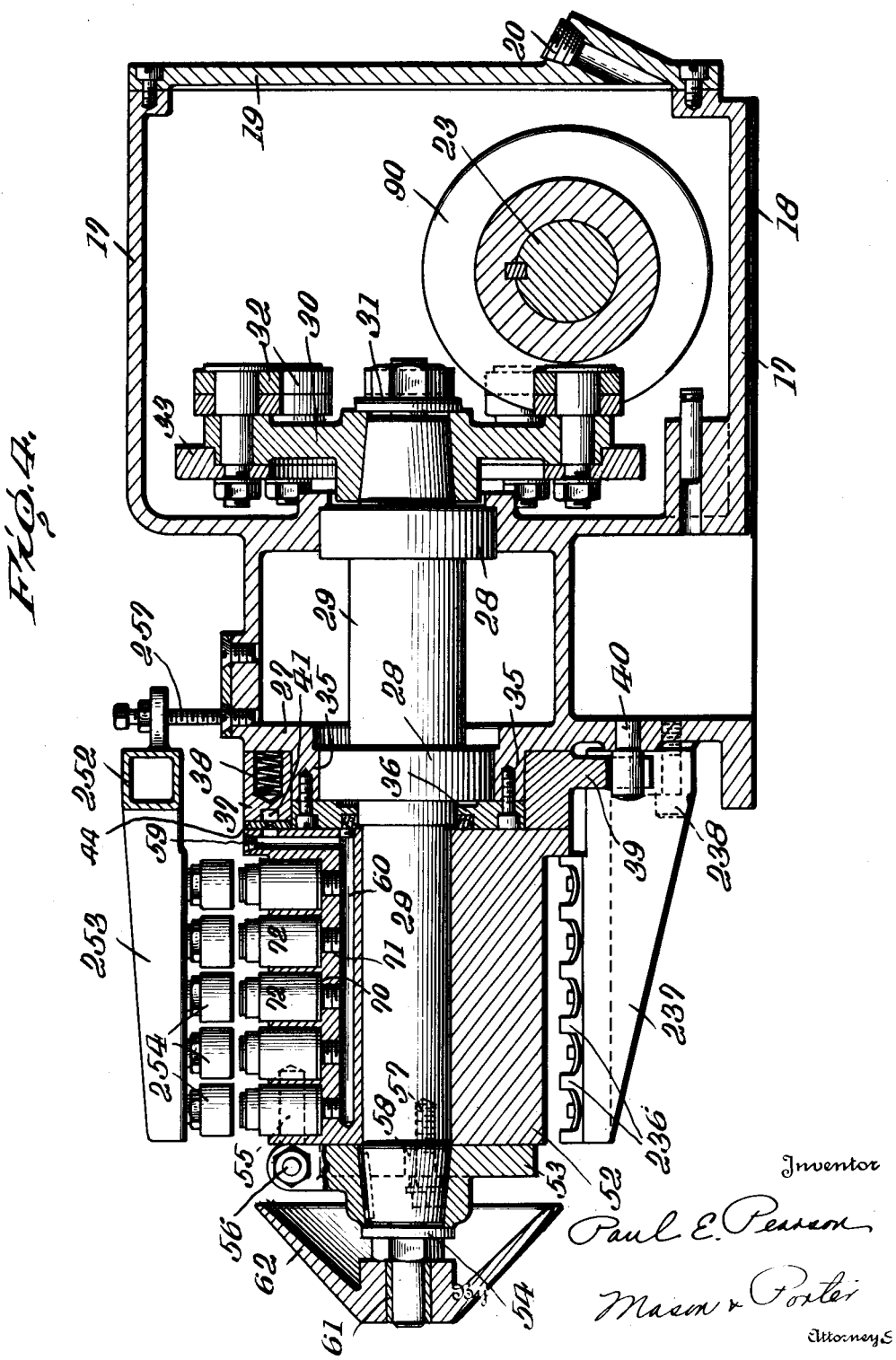

Feb. 2, 1943.  P. E. PEARSON  2,309,667
MACHINE FOR FORMING AND AFFIXING CENTER SPOTS TO CROWN CAPS
Filed Oct. 28, 1938  18 Sheets-Sheet 5
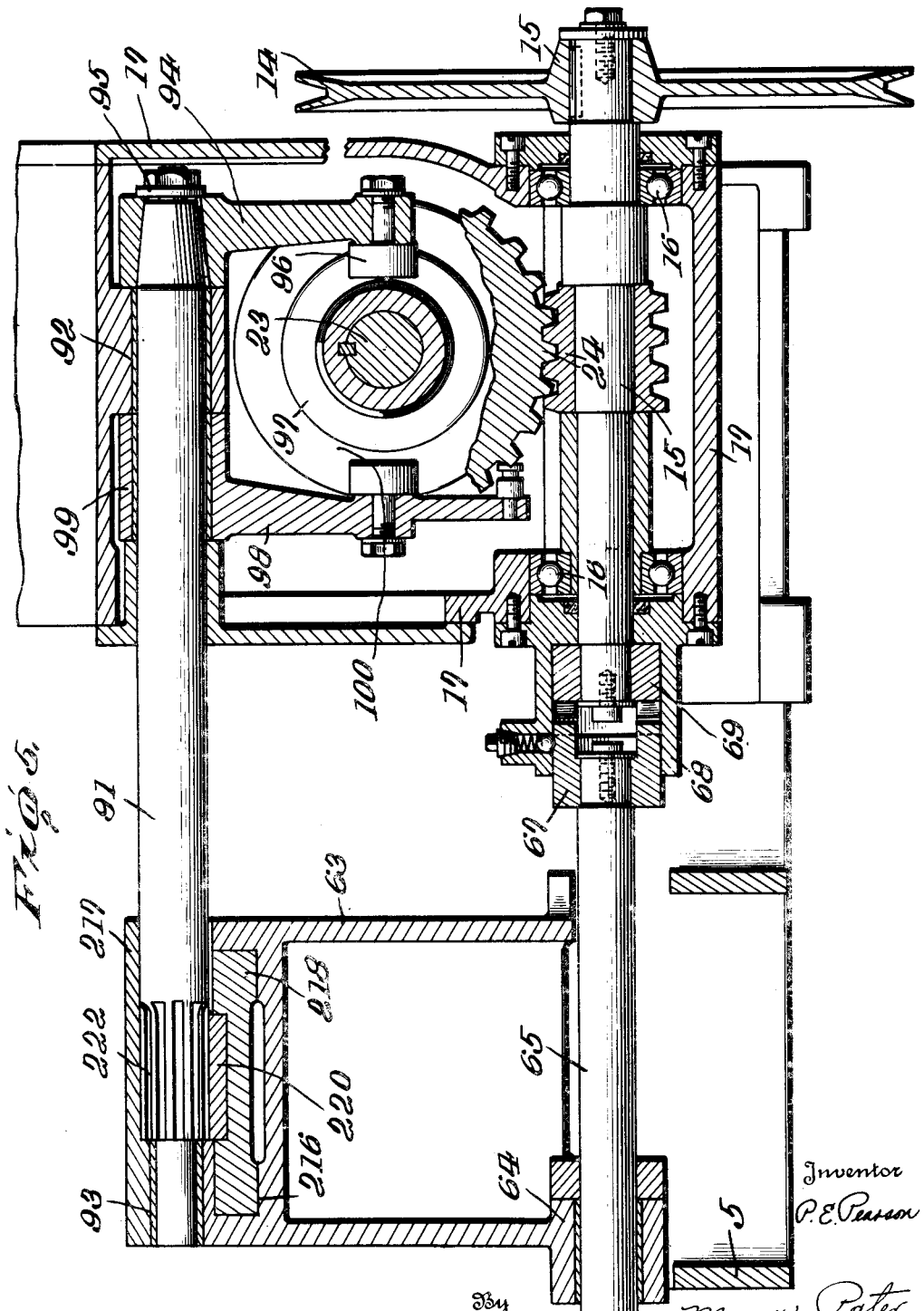
Inventor
P. E. Pearson
By Mason & Porter
Attorneys

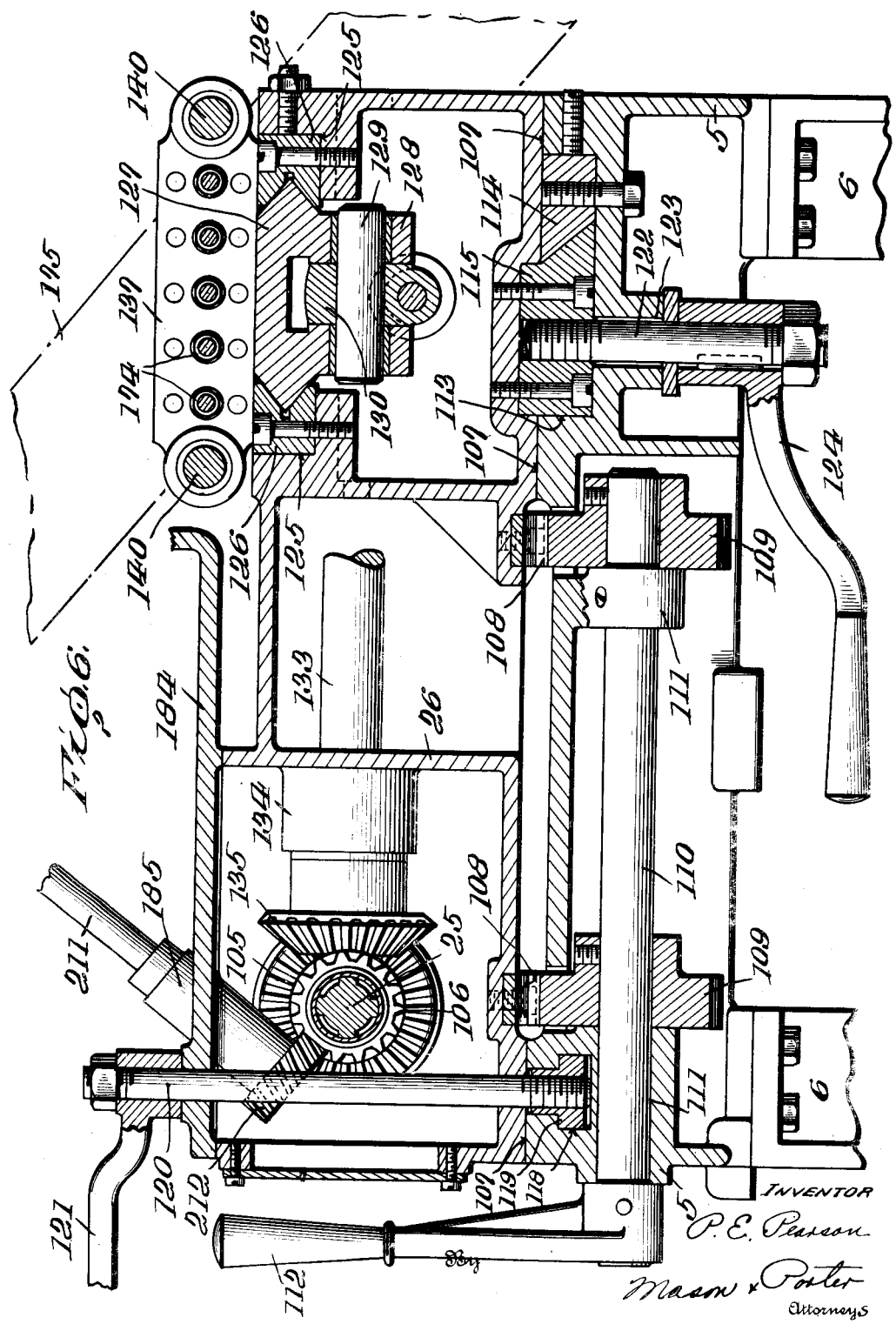

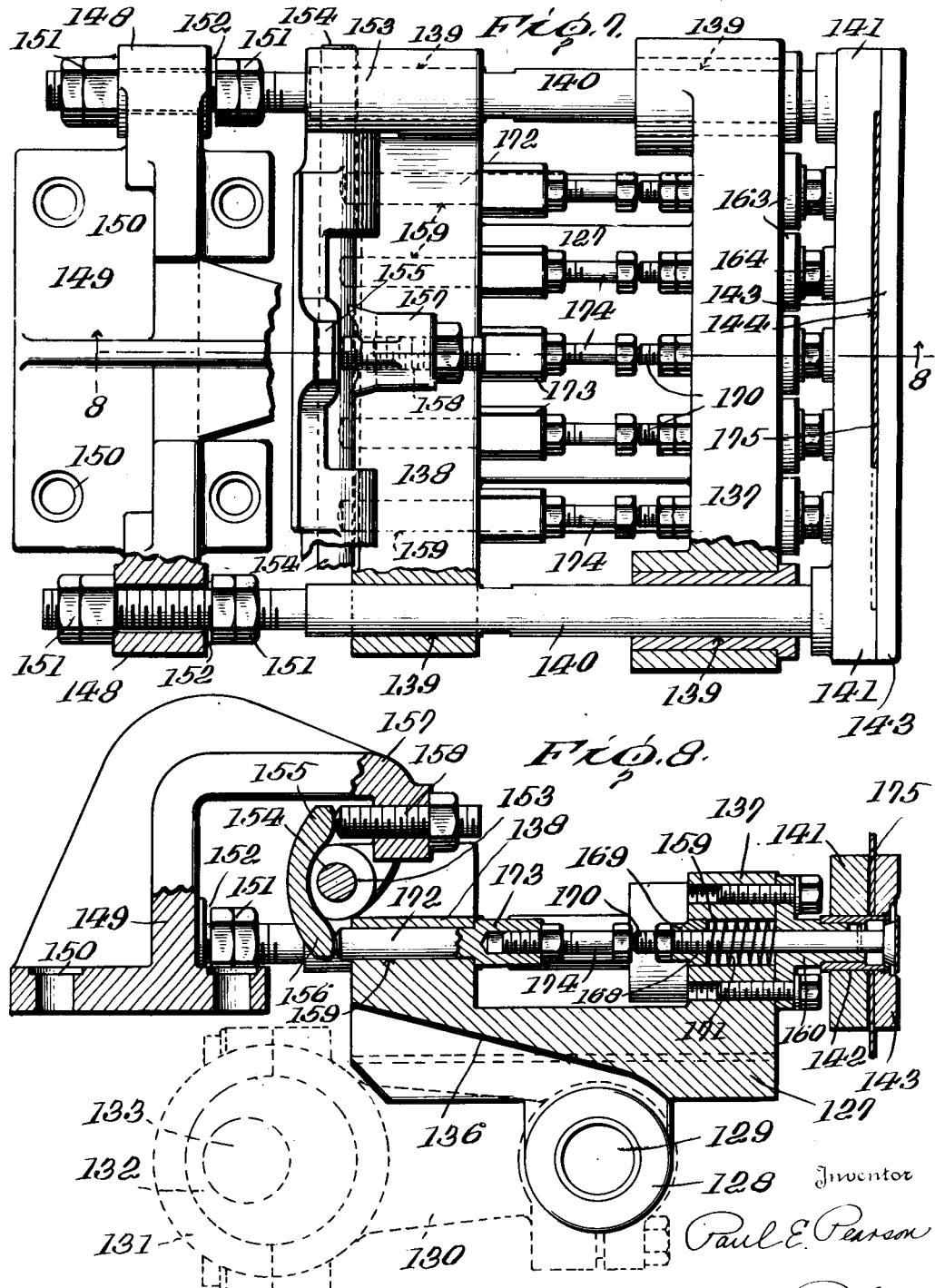

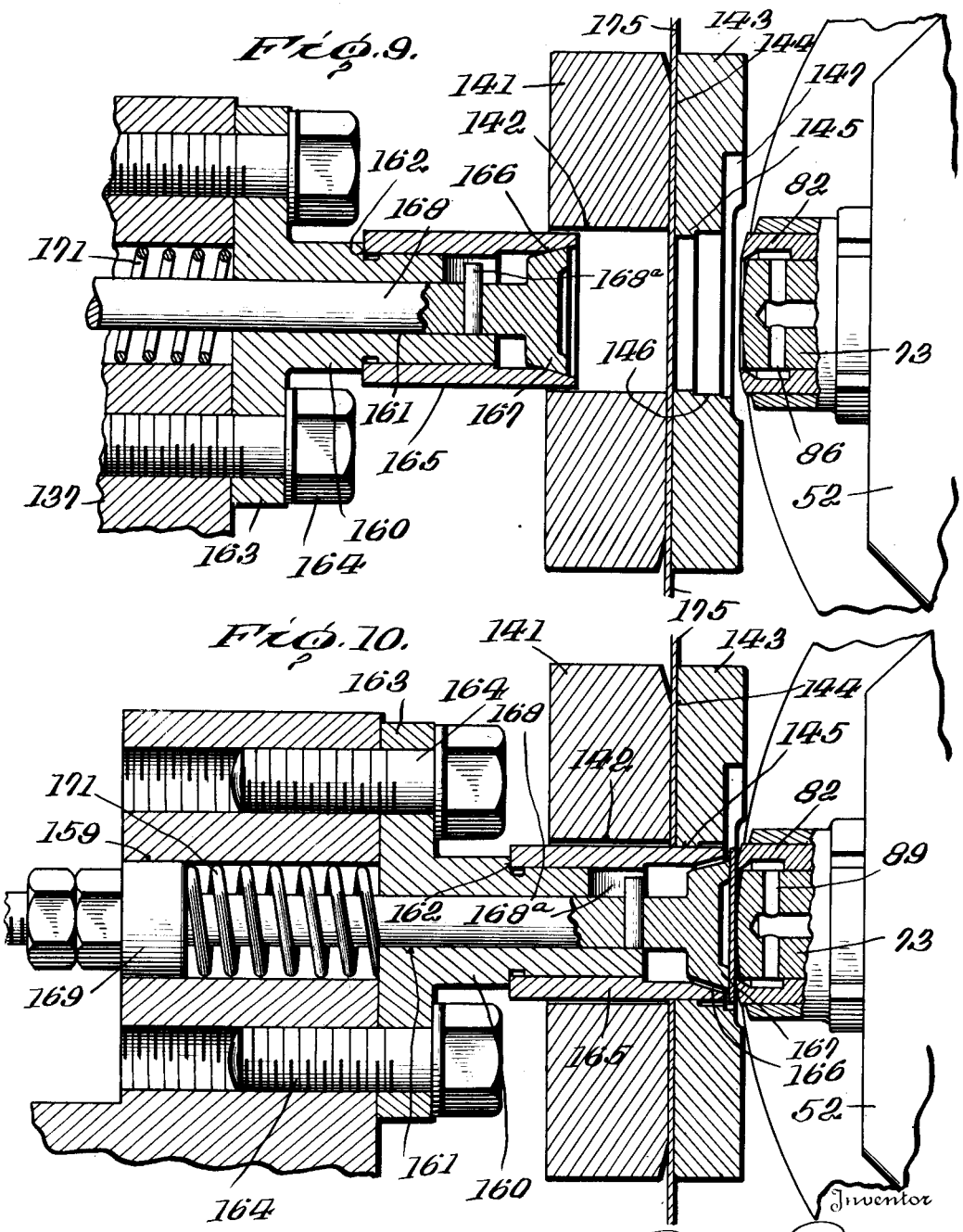

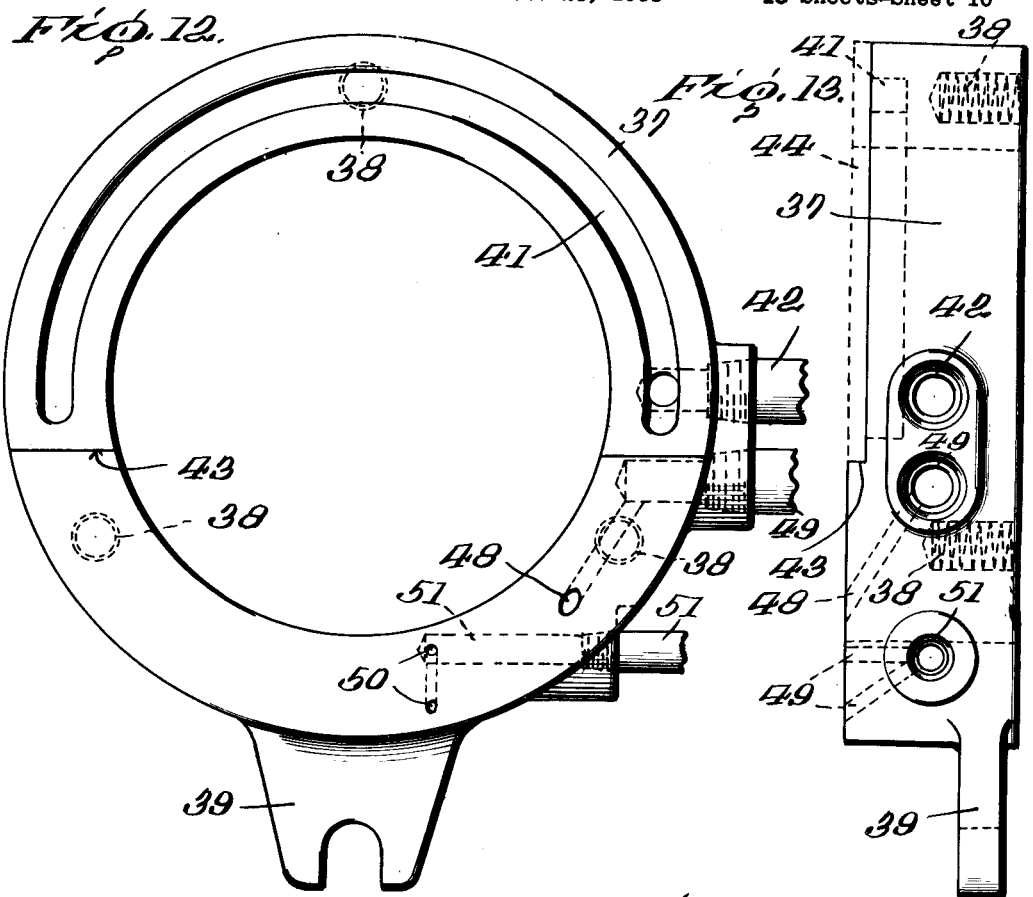
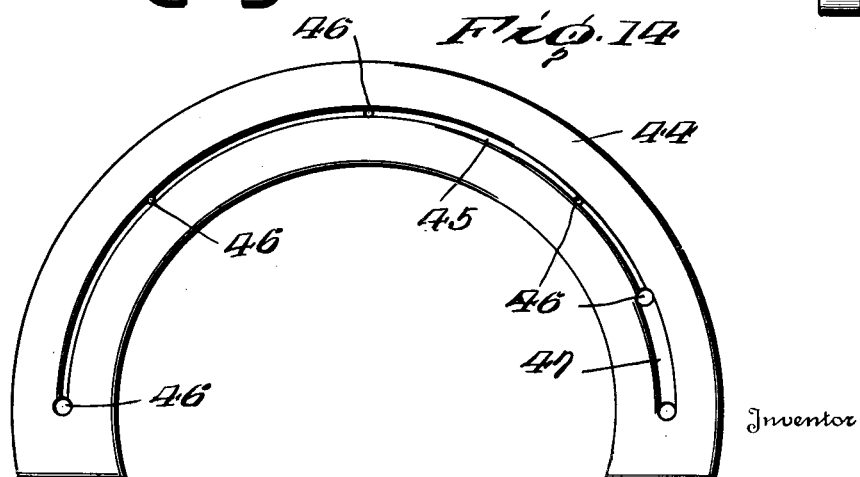

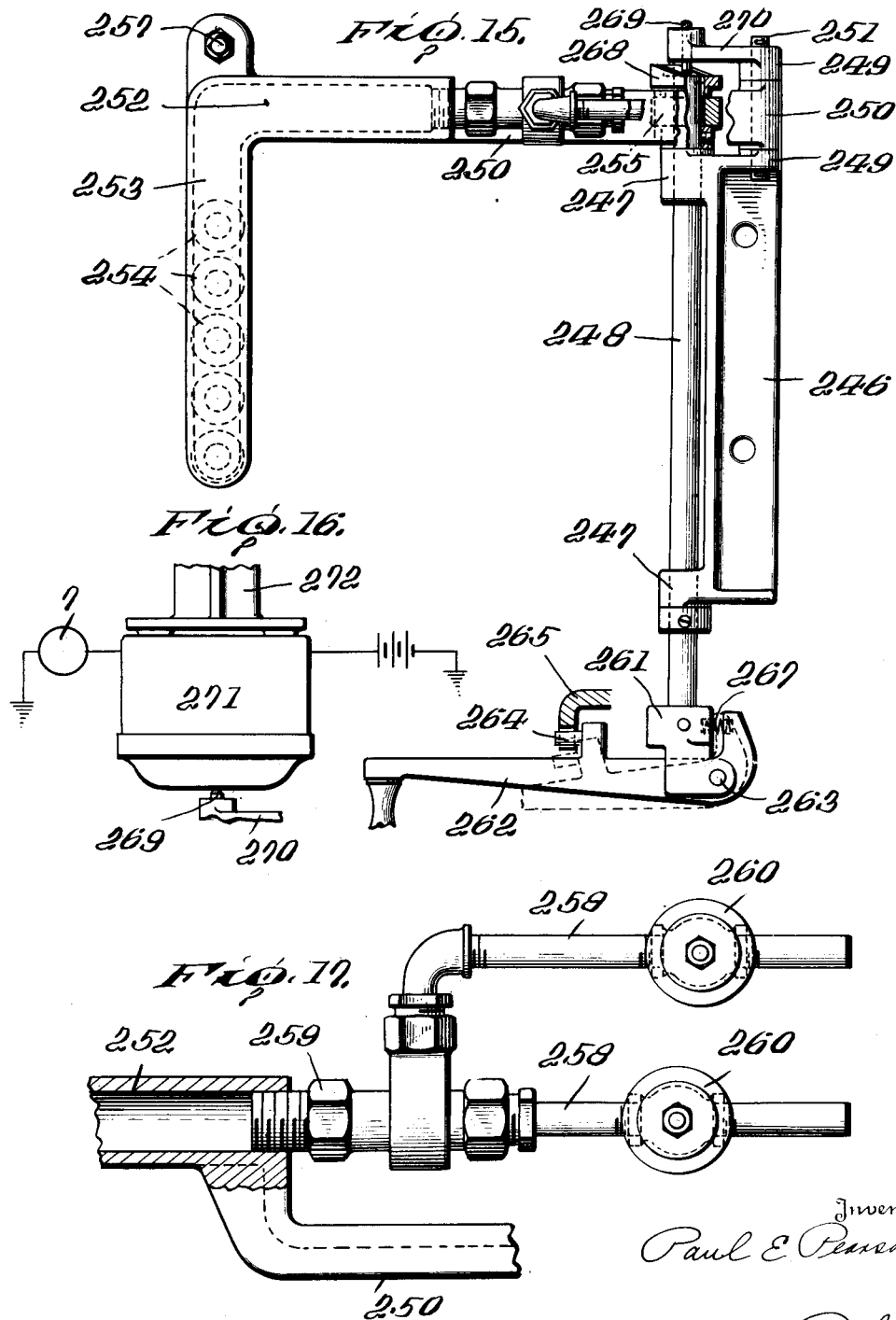

Feb. 2, 1943.   P. E. PEARSON   2,309,667
MACHINE FOR FORMING AND AFFIXING CENTER SPOTS TO CROWN CAPS
Filed Oct. 28, 1938   18 Sheets-Sheet 12
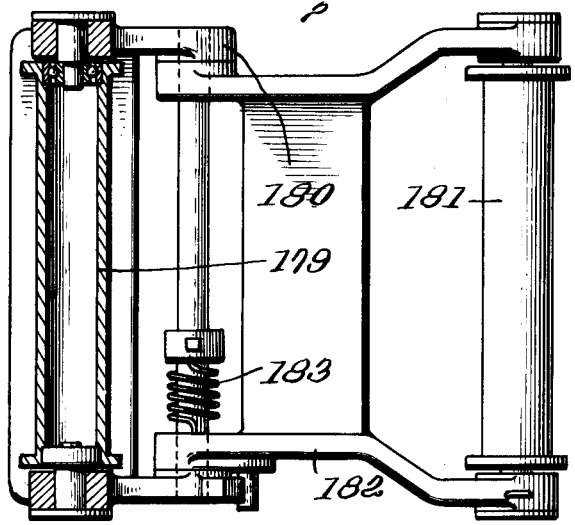
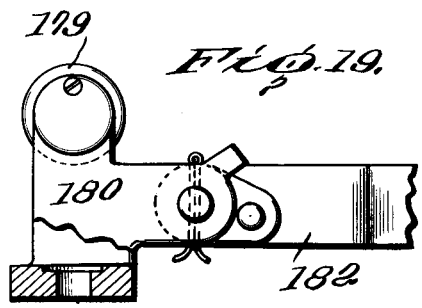
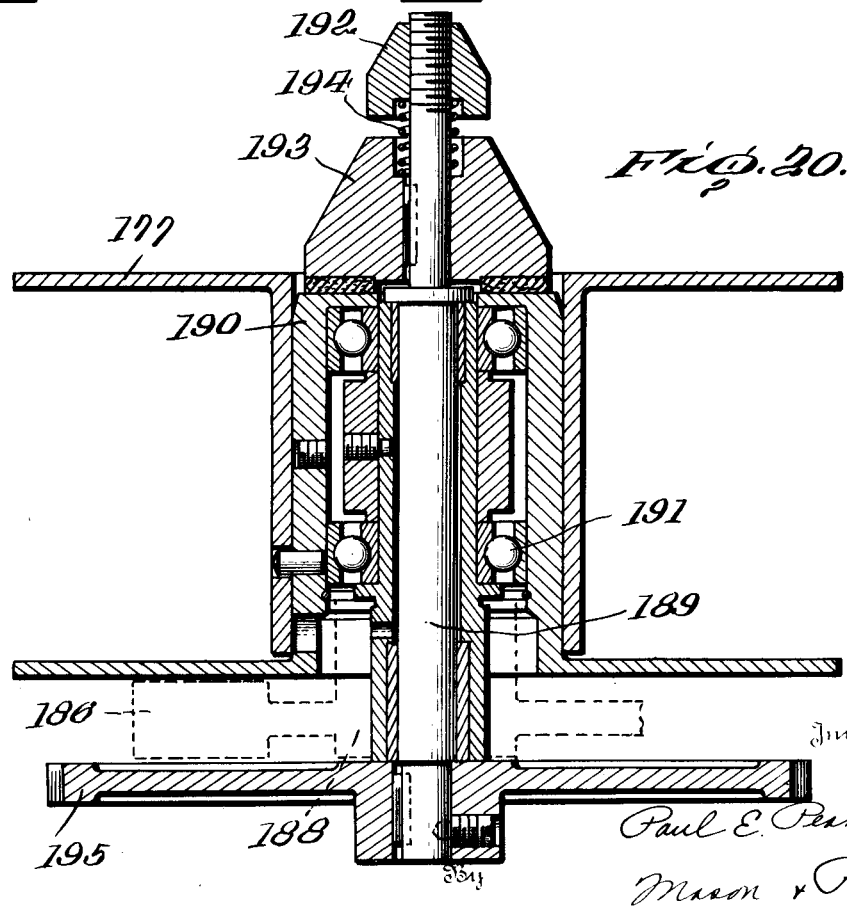
Inventor
Paul E. Pearson
Mason & Porter
Attorneys

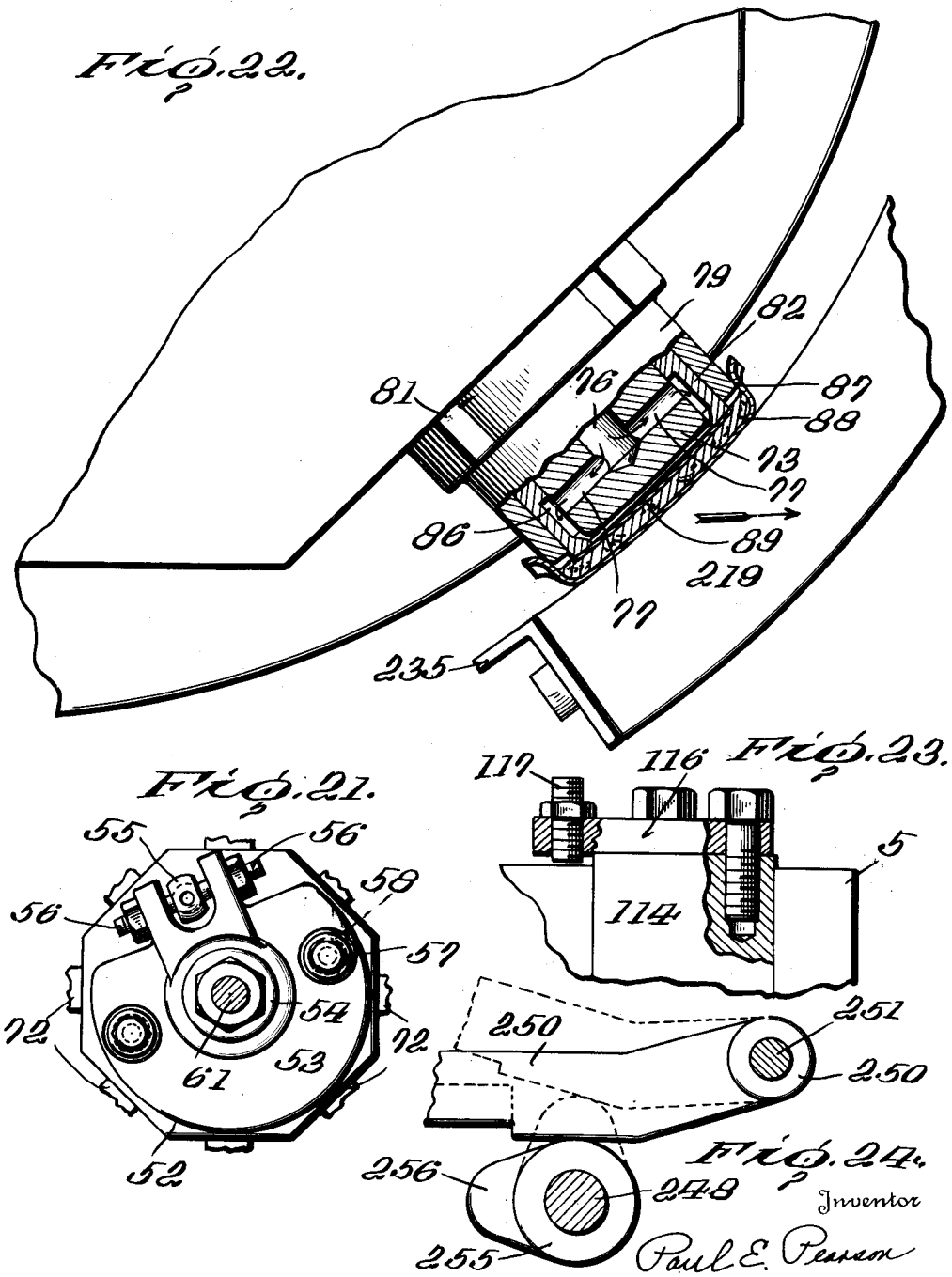

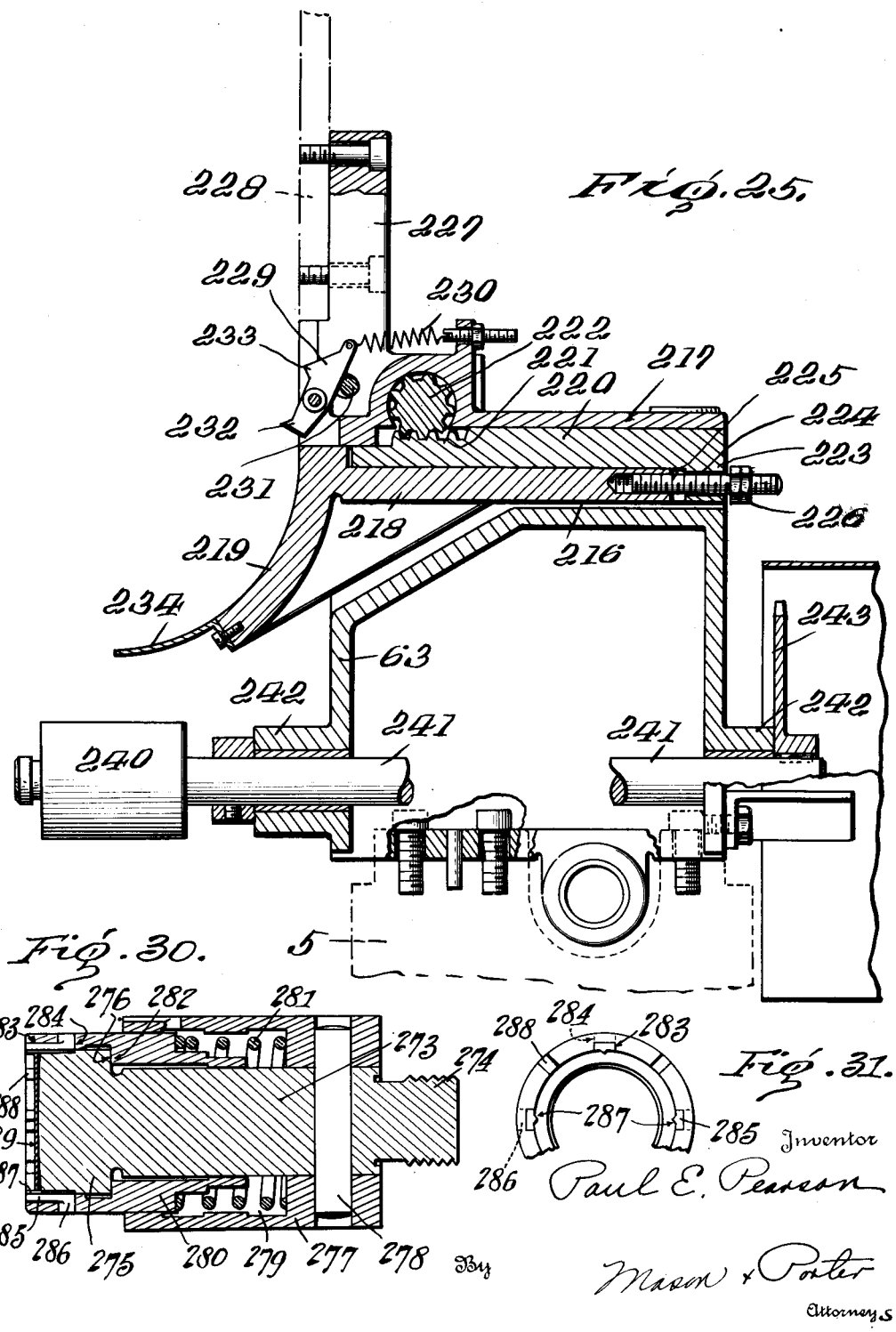

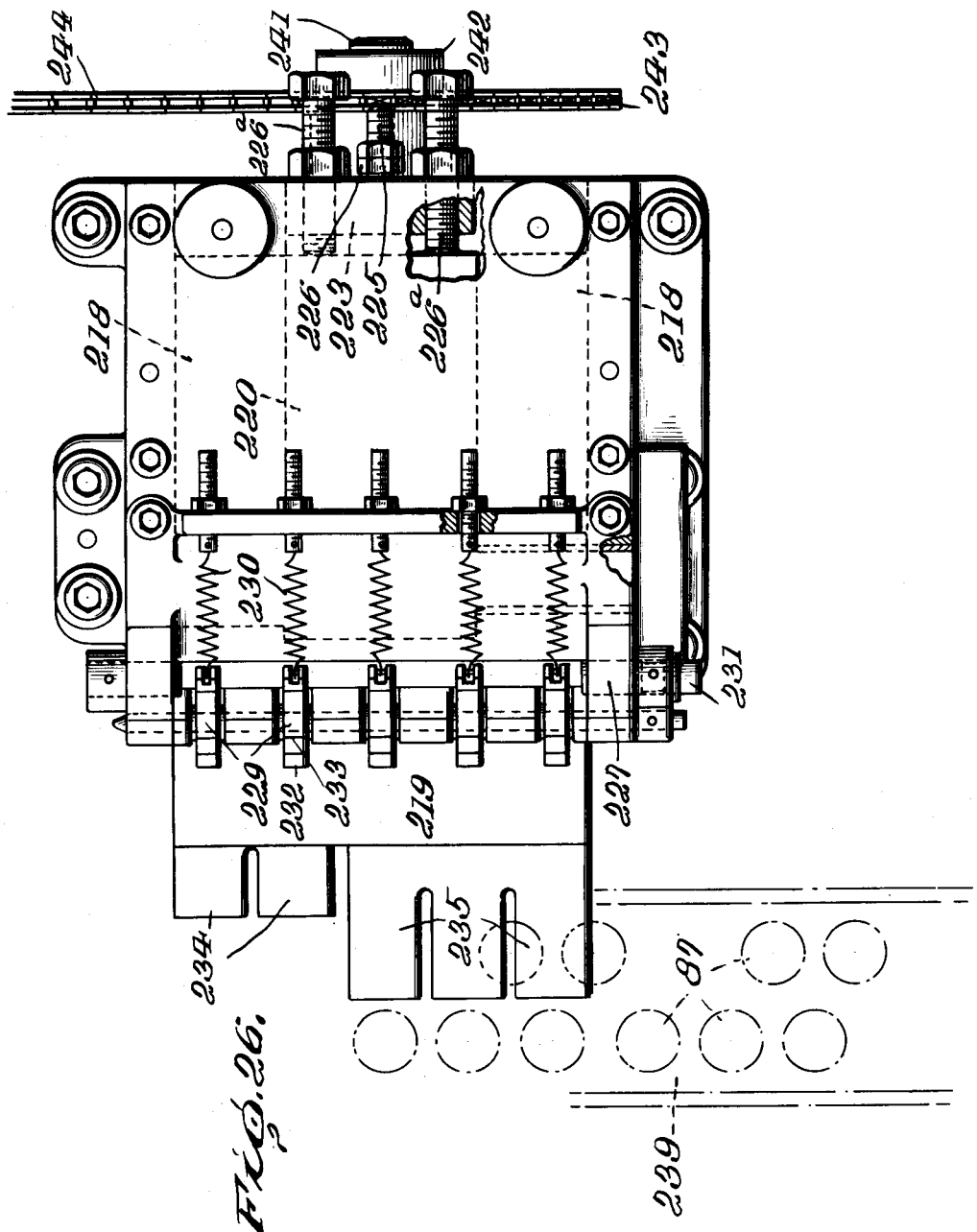

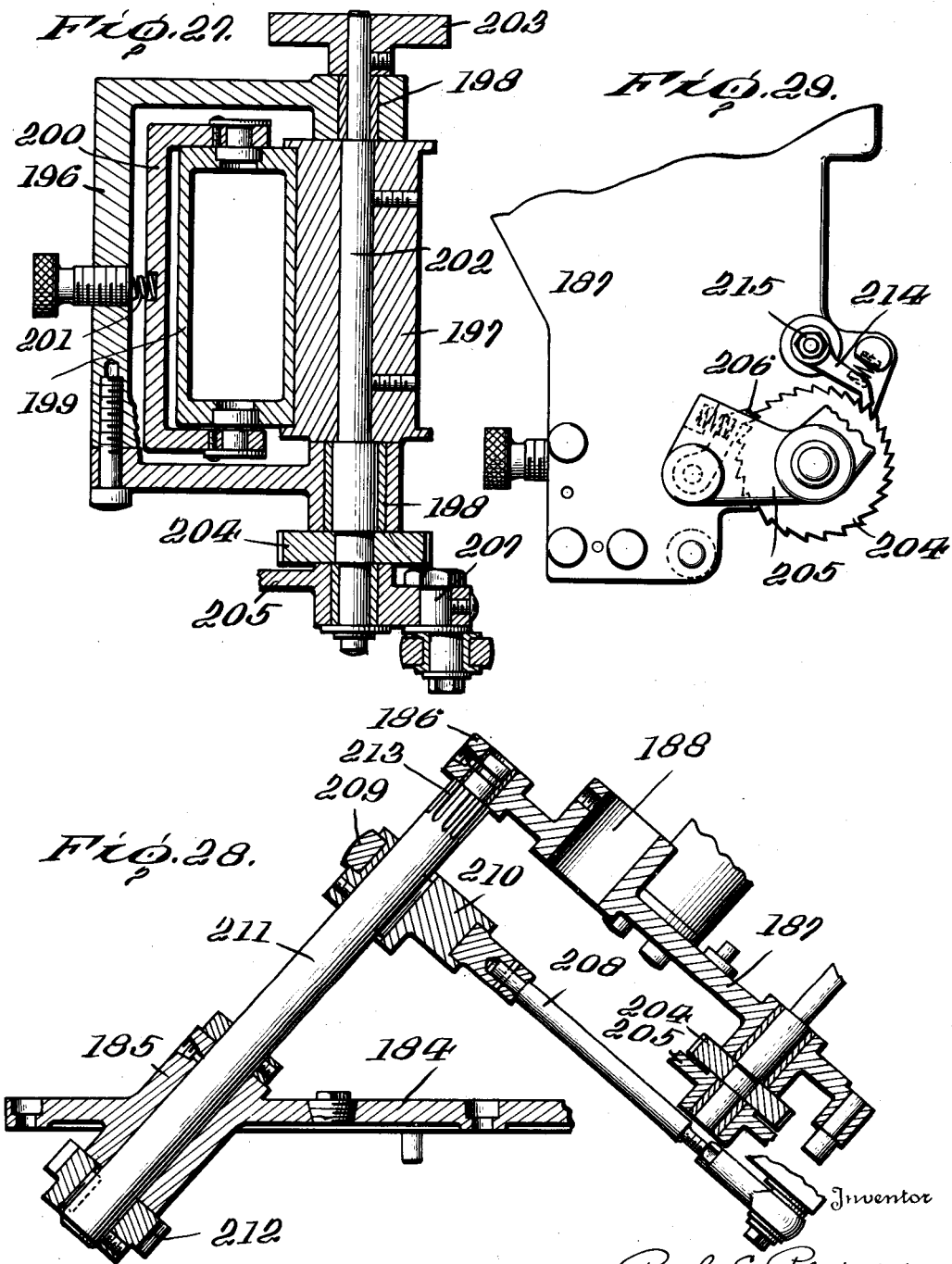

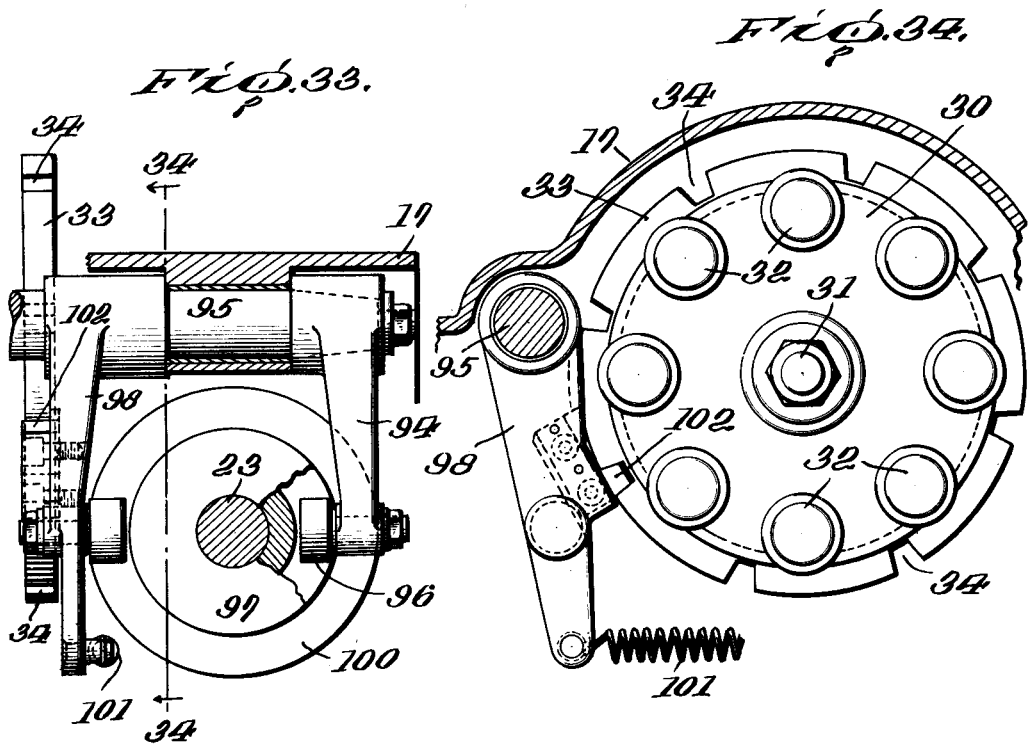
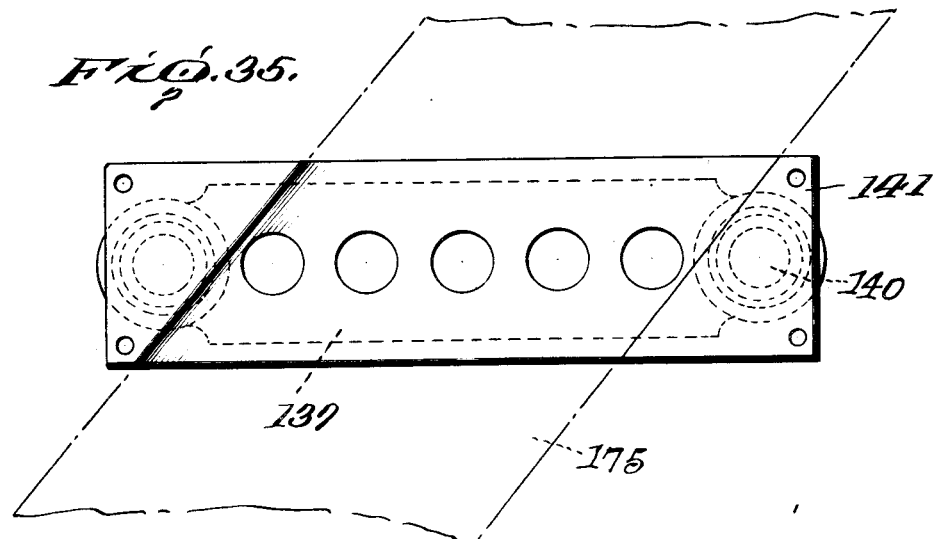

Patented Feb. 2, 1943

2,309,667

UNITED STATES PATENT OFFICE 2,309,667

MACHINE FOR FORMING AND AFFIXING CENTER SPOTS TO CROWN CAPS

Paul E. Pearson, Chicago, Ill., assignor to Continental Can Company, Inc., New York, N. Y., a corporation of New York Application October 28, 1938, Serial No. 237,534

35 Claims. (Cl. 113—80)

The invention relates generally to apparatus for forming and affixing center spots to container closure caps of the crown type, each such cap including a metallic cup having a skirt adapted to fit over and grip the pouring neck of a can, bottle, or other container and a sealing pad of cork or other suitable yieldable material for engaging said neck and effectively sealing the contents of the container, and said invention primarily seeks to provide a machine embodying certain new and useful improvements over the apparatus disclosed in my co-pending application for U. S. Letters Patent, filed July 12, 1937, Serial Number 153,245, and now Patent No. 2,171,258, granted August 29, 1939.

Closure caps designed for use on containers for beer or similar beverages usually have the sealing pads thereof faced with an impervious liner disk of aluminum or other foil or treated paper so as to prevent direct contact between the beverage and the pad and also to prevent leakage of gases. It has been found advantageous to employ facing disks of the "center spot" type, that is to say, disks of a diameter less than that of the pad so as to protect the beverage from pad contact and yet permit contact between the container neck and an annulus of pad surface so as to provide the most effective seal possible. The affixing of lining disks to cap pads, particularly disks of the "center spot" type, has presented numerous problems. Probably the most effective manner of affixing the disks has been by use of a heat fusible adhesive, that is to say, an adhesive normally non-tacky but rendered tacky by application of heat.

An object of the invention is to provide a machine of the character mentioned embodying a novel construction and arrangement of spot carrying turret or rotor head, novel spot carrier elements movable with the head, novel means for forming the spots and attaching them to said carrier elements, and novel means for bringing about interengagement of the carrier elements and spots with the crown caps to which said spots are to be affixed.

Another object of the invention is to provide a novel form of spot carrier element having peculiar provision for effecting proper centering of the spots, for effecting pneumatic attachment of the spots with the element, and for applying affixing pressure to the spots both mechanically and pneumatically.

Another object of the invention is to provide novel heating means for heating and rendering tacky the adhesive borne by the spots, and novel means for simultaneously positioning the heating means and for starting or stopping operation of the machine.

Another object of the invention is to provide novel means movable back and forth for applying pressure to the spots after they have been affixed to the caps.

Another object of the invention is to provide a spotted cap take off conveyor and novel means for depositing the spotted caps on the conveyor in separate rows so as to facilitate inspection.

Another object of the invention is to provide novel means for indexing the rotor head and means enabling adjustment of the head relative to the indexing means so as to alter the direction of projection of the carrier elements.

Another object of the invention is to provide a machine of the character stated in which is included a spot forming or punching unit for punching spots and applying them to the carrier elements of the rotor head, means for operating the head and the punching unit in timed relation, and means enabling separation of the unit and the head to render each readily accessible for inspection, repairs or the like, without disturbing the timed relation of the respective operating connections.

Another object of the invention is to provide a novel construction and arrangement of spot forming punch equipments including stripping means for stripping spots from the punches and applying them to the carrier elements, and means for assuring proper centering of the spots on said carrier elements.

Another object of the invention is to provide a novel form of spot carrier element having provision for mechanically, rather than pneumatically, holding the spots thereon.

Another object of the invention is to provide a spot material web supporting means movable with the punching unit in its movement of separation with relation to the rotor head.

Another object of the invention is to provide novel means for supporting, feeding and tensioning the web of spot material.

Another object of the invention is to provide novel means for disposing the spot material web angularly with respect to the punch unit and for adjusting the length of the step feed movements imparted thereto so as to minimize waste.

With the above and other objects in view that will hereinafter appear, the nature of the invention will be more fully understood by following the detailed description, the appended claims, and the several views illustrated in the accompanying drawings.

In the drawings:

Figure 1 is a front elevation of a center spot forming and applying machine embodying the invention.

Figure 2 is a left end elevation, parts of the framing being broken away.

Figure 3 is a fragmentary rear elevation, parts being broken away and in section at the plane of the cam shaft.

Figure 4 is a detail vertical cross section taken on the line 4—4 on Figure 3.

Figure 5 is a detail vertical cross section taken substantially on the line 5—5 on Figure 3.

Figure 6 is a fragmentary vertical section taken through the punch unit housing and base head across the position of the punch slide.

Figure 7 is a detail plan view of the punch slide and the associated plunger actuating bracket.

Figure 8 is a vertical longitudinal section taken on the line 8—8 on Figure 7.

Figure 9 is an enlarged fragmentary sectional view illustrating one of the spot forming punches as moving to the spot forming or punching position.

Figure 10 is a view similar to Figure 9 and illustrates a position of parts in which the spot has been formed and the punch unit is starting its return movement.

Figure 12 is a front face view of the valve ring with the facing plate removed therefrom.

Figure 13 is an edge view of the ring shown in Figure 12.

Figure 14 is a front face view of the valve ring facing plate.

Figure 15 is a detail plan view of the spot heating equipment and the means for moving it into and out of proximity with the rotor head.

Figure 16 is a detail view illustrating the control switch equipment.

Figure 17 is a fragmentary elevation illustrating the gas and air connections with the gas manifold.

Figure 18 is a detail view illustrating the foil web tightener equipment.

Figure 19 is a fragmentary end view of the foil web tightener.

Figure 20 is a detail sectional view illustrating the foil web take-up spool.

Figure 21 is a detail view illustrating the means for adjusting the rotor head about its mounting shaft.

Figure 22 is a detail view illustrating a spot carrying element and the presser element, the latter being retracted and the spot being subjected to centrally directed blast of air.

Figure 23 is a detail view illustrating the punch equipment limiting stop means.

Figure 24 is a detail view illustrating the operation of the gas manifold lifting cam.

Figure 25 is a detail vertical section illustrating the crown cap presser and the mounting thereof.

Figure 26 is a plan view of the parts illustrated in Figure 21.

Figure 27 is a detail sectional view illustrating the foil feeding roller mounting.

Figure 28 is a fragmentary sectional view illustrating the driving means for the ratchet and pawl foil web feed.

Figure 29 is a fragmentary side elevation of the ratchet and pawl equipment.

Figure 30 is a detail central longitudinal section of a form of spot carrier element having provision for mechanically holding the spots thereon.

Figure 31 is a fragmentary end elevation of the spot holding and centering sleeve of the element shown in Figure 30.

Figures 33 and 34 are fragmentary vertical cross sectional and longitudinal sectional views, respectively, illustrating the cooperative relation of the stop disk and the stop lever and lug.

Figure 35 is a detail face view of the punch block showing the position of the grooveway therein for the foil web.

Figure 11:
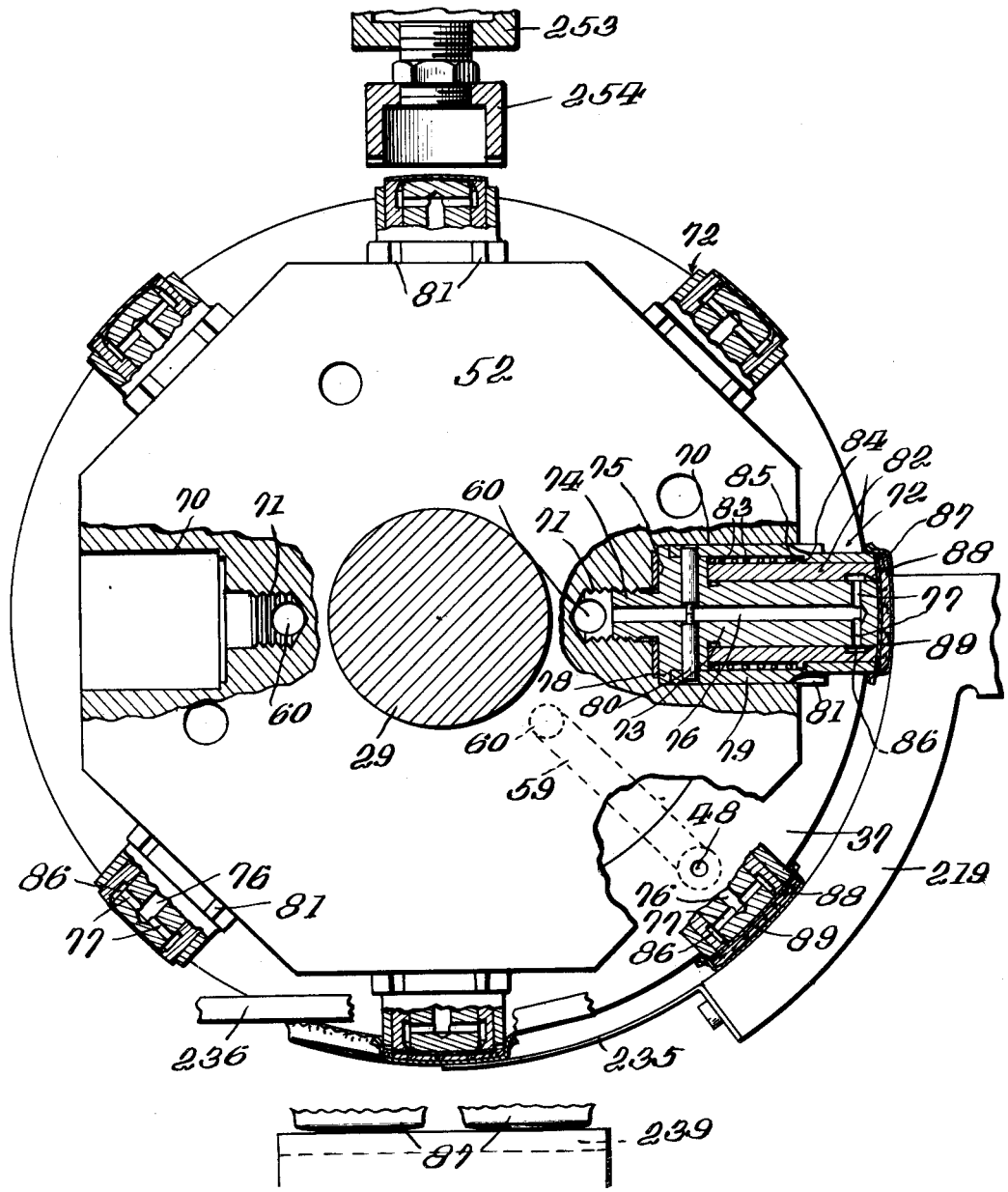
Figure 11 is an enlarged end view of the rotor head, parts being broken away and in section to better illustrate the construction of the spot carriers.
Figure 32:
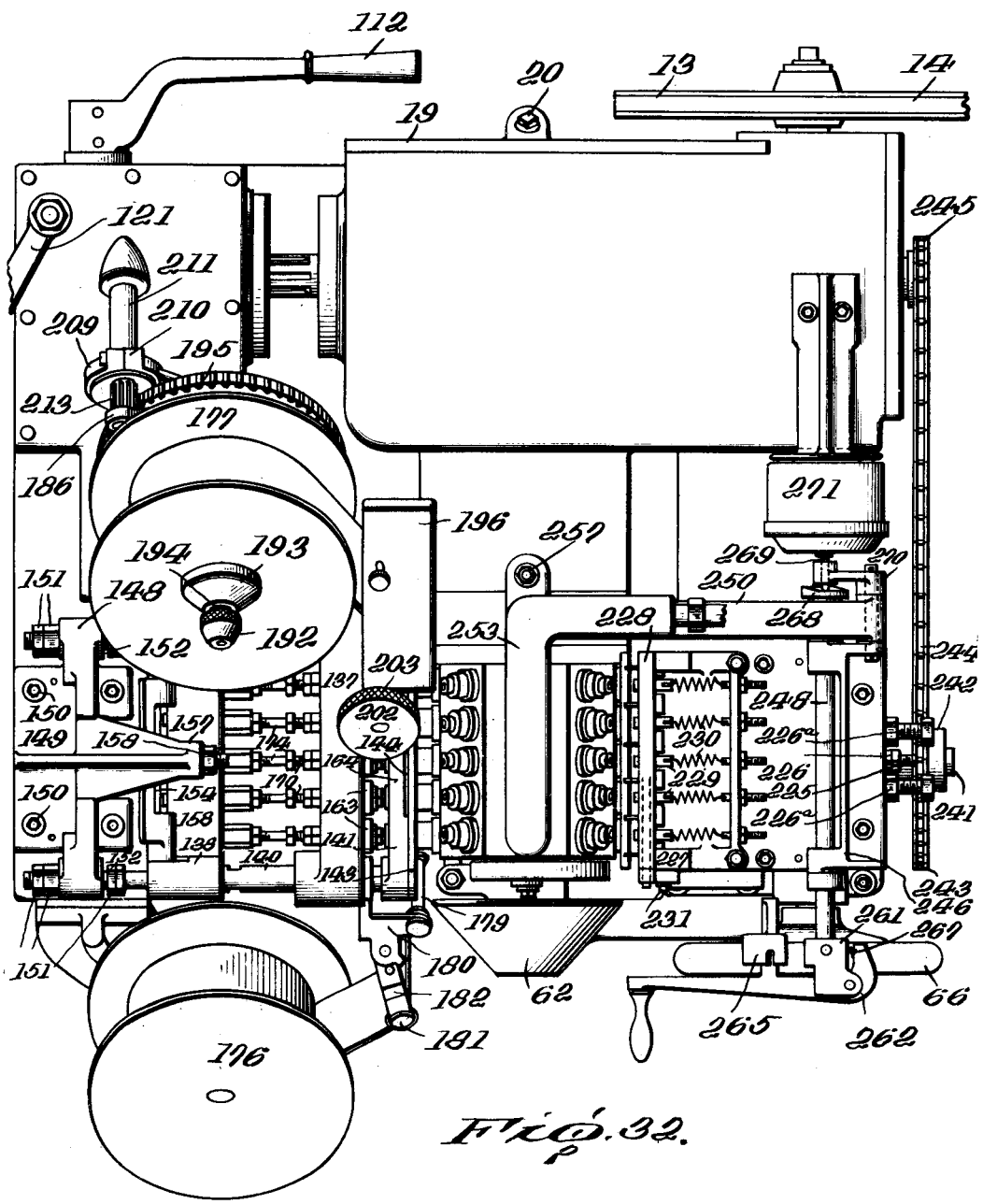
Figure 32 is a plan view of the machine.

The improved spot forming and affixing machine includes a framing having a base head 5 supported on legs 6 and from which a driving motor 7 is suspended. The motor is supported on a pad 8 pivotally secured as at 9 to a mounting base 10 carried by the head 5, said base being adjustable about a pivot 9 by manipulation of a screw equipment 11 so that the driver pulley 12 of the motor can be adjusted in space in order to tension the drive belt 13 through which power is transmitted from the driver pulley to the large power applying pulley 14. See Figures 1, 3 and 5.

The power applying pulley 14 is secured on a driver shaft 15 rotative in bearings 16 in a main housing casting 17 supported as at 18 upon the base head 5. The housing 17 includes a removable rear wall plate 19 having a port 20 through which a lubricant level can be maintained within the housing. See Figures 4 and 5.

The housing 17 also includes removable side plates 21 supporting bearings 22 in which a cam shaft 23 is rotatably mounted as shown in Figure 3 of the drawings. The shaft 23 is driven by worm gear and worm wheel equipment 24 from the driver shaft 15. See also Figure 5. It will be noted that the cam shaft 23 includes a spline end 25 which extends through one of the side plates 21 into the punch unit housing 26.

The housing 17 includes spaced wall portions 27 in which are mounted bearings 28 for rotatably supporting a shaft 29, one end of which projects into the housing portion closed by the wall plate 19 where it carries an indexing disk 30 which is secured on said end as at 31. The disk 30 carries eight indexing rollers 32 supported on studs which project in equidistantly spaced relation from the inner face of the disk, as shown in Figures 3 and 4 of the drawings. The disk 30 also carries a stop ring 33 having eight stop notches 34 spaced equidistantly about the periphery thereof.

The outer end of the shaft 29 extends forwardly through a cylindrical hub 35 projecting from the foremost housing wall 27 and against which a sealing plate 36 is secured in position for surrounding and engaging the shaft 29 in the manner illustrated in Figure 4.

A valve ring 37 surrounds the hub 35 and the sealing ring 36, and a plurality of compression springs 38 interposed between the ring 37 and the adjacent wall 27 in sockets formed in said ring constantly tend to force the ring forwardly. The ring 37 includes a depending lug 39 which engages a pin 40 projecting forwardly from the housing 17 and which serves to overcome a tendency of the ring to rotate about the hub 35. The manner of mounting the ring is illustrated in Figure 4 of the drawings, and the detailed construction of the ring is best illustrated in Figures 12 to 14.

The ring 37 has its front face cored out to form a suction duct 41 extending approximately 180° about the face of the ring. The duct 41 is connected as at 42 with any suitable source of negative pressure such as an evacuating pump (not shown). The face portion of the ring equipped with the duct 41 is recessed as at 43 to receive a duct facing plate 44 which may be secured in any approved manner to the face of the ring in the position illustrated by dotted lines in Figure 13.

The duct facing plate 44 is shown in detail in Figure 14 and includes a narrow face groove 45 which communicates at spaced intervals, through restricted ports 46, with the ring duct 41. One portion 47 of the face groove 45, extending about approximately 22½° of the circumference of the plate, is larger or of greater width than the remaining portion of the groove. It is within this area that initial attachment of the spots with the carrying element takes place, and the increased size of the grooving is intended to facilitate the initial attachment without affording exaggerated suction communication. The ring 37 also includes an air pressure port 48 connected by a duct 49 with any suitable source of air at greater than atmospheric pressure such as a pump or the like (not shown). The ring also includes oil ducts 50 connected by a duct 51 with a suitable lubricant source (not shown). See Figures 12 and 13.

The forwardly projecting end of the shaft 29 is surrounded by a rotor head 52 which is octagonal in cross section and opposed at its front end by a securing plate 53 keyed to the shaft 29 and secured thereon as at 54. The head 52 is freely movable about the shaft 29, and in order to facilitate alignment of the faces of the head with cooperating mechanisms of the machine, a pin 55 is socketed in and projects from the front end of the head to a position between two adjusting screws 56 supported in opposition one to the other and to the pin 55 in ears formed on the plate 53. By adjusting the screws 56 the position of the head faces with respect to the fixedly mounted plate 53 can be adjusted to properly align the faces with cooperating mechanisms of the machine, after which the adjustment can be secured by screws 57 which pass through enlarged receiving apertures 58 in the plate 53 and enter threaded receiving sockets in the rotor end. See Figures 4 and 21.

The other or rear end of the rotor head 52 is yieldably opposed by the spring pressed valve ring 37 and is equipped with eight radially disposed ducts 59 each associated with one face of the head and communicating with a longitudinal duct 60 centered inwardly of the associated face. The purpose of the duct communication between the rotor head and the valve ring 37 will be described later. See Figure 4.

At its forward extremity the shaft 29 has bearing as at 61 in a protective hood 62 securely mounted on the press sector and crown cap feed chute supporting housing 63. See Figures 1 and 4 of the drawings.

The housing 63 also affords bearing as at 64 for one end of a clutch shaft 65 equipped with a hand wheel 66 at its outer end and at its inner end with a clutch head 67 slidably and rotatably supported in a cup cap 68 secured to the housing 17. The hand wheel 66 can be manipulated to move the clutch head 67 inwardly or outwardly in the bearing 68 for engagement with or disengagement from the clutch head 69 secured to the end of the shaft 15, thereby making it possible to manually impart movement to parts of the machine. See Figure 5.

At each of its eight faces the rotor head 52 is equipped with a plurality, five being shown, of equidistantly spaced bores 70 each terminating inwardly in a threaded counterbore 71. The counterbores 71 of each group all communicate with the respective duct 60. In each bore is mounted a spot carrying and affixing element generally designated 72. See Figures 1, 4 and 11. Each unit 72 includes a carrier body 73 somewhat cylindrical in shape, and a threaded stem 74 adapted to be threaded into one of the counterbores 71 to secure the unit in position. The body is shouldered as at 75 to seat in the bottom of the respective bore 70 and includes a centrally disposed duct 76 which communicates, through lateral ducts 77 disposed adjacent the outer end of the body, with the exterior of the body. Each body is also shouldered as at 78 to form a seat for a casing sleeve 79 which is removably secured on the body by cross pin equipment 80. The casing sleeve 79 is of a length for registering with the outer extremity of the body 73 and is reduced in diameter to form a shoulder notched as at 81 to receive a spanner wrench or other suitable tool for facilitating the mounting and removal of the units 72.

Each sleeve 79 has an internal diameter larger than the body 73 so as to form an annular space for accommodating a valve sleeve 82, and is counterbored to form a spring chamber for receiving a spring 83 and for forming an abutment shoulder 84. Each spring 83 engages between the body 73 and an abutment collar 85 formed on the respective valve sleeve 82 so as to yieldably hold that collar against the abutment shoulder 84. An annular valve duct 86 is formed in the outer end of the valve sleeve 82 in position for communicating with the lateral ducts 77, and this annular duct extends close to the outer extremity of the sleeve so that when the respective abutment collar 85 is in engagement with the stop shoulder 84 the sleeve 82 will extend slightly beyond the extremity of the body 73 and expose the duct 86 to permit egress or ingress of air through said duct and around the end of the carrier body 73, as shown in positions to the left of Figure 11 and in Figure 22. Whenever the valve sleeve 82 is pressed inwardly against the urge of the spring 83, as shown at the two positions at the lower right in Figure 11 of the drawings and in Figure 9, the communication into and through the duct 86 will be closed so that no appreciable amount of air can enter or leave said duct.

It will be observed by reference to Figures 11 and 22 of the drawings that the outer extremity of each casing sleeve 79 is of a diameter for snugly fitting within the crown caps 87 which are to be equipped with center spots. The crown caps include the usual cork or other filler pads 88, and the center spots are indicated at 89. See Figures 11 and 22.

Within the housing 17 the shaft 23 is equipped with a grooved cam 90 engageable with the indexing rollers 32 for the purpose of indexing the disk 30 and the rotor head 52 movable therewith about the axis of the shaft 29 to serially present the faces of the head and the carrier units 72 projecting therefrom at the various stations. See Figures 3 and 4.

A rock shaft 91 is rockably supported as at 92 in the housing 17, and as at 93 in the housing 63. Within the housing 17 the shaft has a crank arm 94 affixed thereto as at 95, and the arm carries a roller 96 engageable in the groove of a cam 97 fixed upon the shaft 23 and which serves to impart rocking movement to the shaft 91 for a purpose later to be described. See Figures 3 and 5.

A lever 98 is freely pivoted as at 99 on the shaft 92 and carries a roller held against the face of a plate cam 100 by a spring 101 anchored within the housing 17 in the manner illustrated in Figure 3. The lever 98 carries a stop lug 102 engageable in the notches 34 of the stop disk 33. The cam 100 is timed to cooperate with the turret head indexing cam 90 so as to lift the stop lug out of an engaged notch 34 just prior to indexing of the rotor head and to again release the lug so that it will ride the edge of the disk 34 prior to termination of an indexing movement and fall into the proper notch to definitely position the rotor head upon completion of the particular indexing movement. See also Figure 5.

Within the housing 26, a sleeve shaft 103 is rotatably supported in bearings 104 and carries a miter gear 105 and a spiral gear 106. The sleeve is splined on the end of the shaft extension 25 so as to be driven thereby, and the sleeve is capable of sliding movement on the shaft extension without disturbing this driving relation. See Figures 3 and 6.

The housing 26 is slidably supported as at 107 on the base head 5 and has a pair of racks 108 secured in parallel spaced relation to the under surface thereof. The racks are engaged by gears 109 secured upon a shaft 110 rotatably supported as at 111 in the base head 5 and extended toward the rear beyond said base head. The extended end of the shaft is equipped with a hand lever 112, and by manipulation of this lever the gears 109 may be caused to shift the housing 26 and all parts carried thereby toward or from the rotor head for a purpose later to be described. See Figure 6.

The upper surface of the base head 5 is provided with a longitudinal recess 113, and a dovetail keeper rail 114 is secured at one side of the recess. A dovetail guide rail 115 is secured to depend from the housing 26 and slidably fits the recess 113 to the side of and partially beneath the rail 115. See Figure 6. It will be observed by reference to Figure 23 that the end of the keeper rail 114 toward the rotor head is equipped with a bracket 116 which overlies the end of the guide rail 115 and carries an adjustable stop screw 117 for engaging the rail 115 and limiting movement of the housing 26 toward the rotor head.

The upper face of the base head 5 also includes a longitudinally extended T-groove 118, and a T-head 119 is slidable in said groove. A clamp screw 120 is threaded into the member 119 and passes upwardly through the housing 26 where it is equipped with a hand lever 121. A clamp screw 122 is threaded upwardly into the guide rail 115 through a longitudinal slot 123 formed in the base head 5, and this screw also has a hand lever 124 affixed to its lower end. By tightening the screws 120 and 122 by manipulation of the handles 121 and 124, the elements 119 and 115 can be clamped against the base head 5 to secure the housing 26 in fixed position. By loosening the screws 120 and 122 and manipulating the lever 112 in the manner hereinbefore described, the housing can be moved on the base head 5. See Figure 6.

The housing 26 includes a pair of spaced parallel recesses 125 in each of which is removably secured a grooved guide rail 126. A slide member 127 is slidable in the grooveway thus formed, laterally with respect to the axis of the rotor head 52. The slide includes a pair of spaced depending bearing ears 128 for receiving a drive pin 129 projecting trunnion fashion from the free end of a pitman 130, the other end of the pitman being equipped with a strap 131 which encircles an eccentric 132 secured upon a shaft 133. The shaft 133 has rotary bearing as at 134 in the housing 26 and carries a miter gear 135 through which rotation is imparted to the shaft 133 from the miter gear 105 secured upon the spline shaft 23, 25. See Figures 3 and 6.

The slide 127 is recessed at 136 to permit freedom of movement of the pitman 130 and is provided with a pair of upstanding bearing bars 137, 138. These bars are disposed in spaced relation, parallel one with the other and with the axis of the rotor head 52, the bar 137 being disposed nearest said rotor head.

At each end each bar 137 and 138 has a bearing bore 139. The bores 139 are aligned in pairs and each pair slidably receives a rod 140. The rods extend through their bearings in the bars 137 and 138 and are fixed to and carry a punch block 141, having five equidistantly spaced punch facing bores 142 formed therein, and a die plate 143 removably secured to said block in any approved manner. The plate 143 and the block 141 are in face contact except for a grooveway 144 formed between them and traversing all of the bores 142 at an angle of approximately 40°. The die plate 143 is equipped with die bores 145 aligned with the block bores 142 and which merge at the opposed face of the plate with clearance recesses 146 of a diameter for receiving the outer ends of the valve sleeves 82 of the spot carrier elements. The exposed face of the plate 143 may also be equipped with upwardly extended clearance recesses 147 for assuring against obstruction of the carrier units during indexing of the rotor head following the forming of the spots and the attachment thereof to the carrier units. See Figures 9 and 10.

At their other ends the rods 140 pass freely through ears 148 in a bracket member 149 stationarily secured as at 150 upon the housing 26. These ends of the rods are threaded and carry spaced abutment and jam nut equipments 151 so placed with relation to the ears 148 as to provide lost motion clearances between the ears and said equipments as indicated at 152. See Figures 1, 7 and 8.

The bar 138 includes upstanding bearing ears 153 in which a cross shaft 154 is rockably mounted. A rocker member is mounted on the shaft 154 and includes a central, upwardly projected lug 155 and a depending full width plunger actuating edge portion 156 disposed below the axis of the shaft 154. See Figures 7 and 8. The bracket 149 includes an overhanging arm portion 157 on which is mounted an adjustable stop screw 158 which opposes and is engaged by the rocker member lug 155 each time the slide 127 approaches the rotor head 52. It will be obvious that upon each such contact of the rocker member lug 155 with the stationary screw 158 the lower edge or plunger actuating portion 156 of the rocker member will be forced toward the right as viewed in Figure 8 of the drawings.

The upwardly projecting bars 137 and 138 of the slide 127 are provided with five pairs of aligned plunger bores 159, those provided in the bar 138 being of smaller diameter than those in the bar 137, as will be observed by reference to Figure 8 of the drawings. Associated with each of these bores 159, the bar 137 carries a punch support member 160. Each member 160 includes a central ejector plunger bore 161 and is reduced at the end thereof directed toward the rotor head 52 to provide a punch sleeve receiving end portion terminating in an abutment shoulder 162. Each member 160 also includes upwardly and downwardly projected apertured ears 163 which are secured by screws 164 to the bar 137.

A punch sleeve 165 is mounted on the reduced end of each of the supporting members 160 in engagement with the abutment shoulder 162 thereof, and each punch sleeve includes a flared end seat 166 for a reciprocable stripper head 167 carried on a plunger 168 slidable in the respective center bore 161. If desired, each supporting member 160 and the associated plunger 168 may be provided with a pin and slot equipment 168ª for preventing displacement of the plunger about its axis.

Within the respective bore 159, each plunger 168 carries an abutment head 169 secured upon the threaded end of the plunger by jam nut equipments through which the extreme end of the plunger passes to form a tappet 170. A spring 171 surrounds each plunger 168 in the respective bore 159, being interposed between the abutment head 169 and the supporting member 160 so as to constantly urge the stripper head 167 against its seat. See Figures 7 to 10. A plunger 172 is slidably mounted in each bore 159 in the bar 138. The plungers 172 extend from the receiving bores at one end for constantly engaging the plunger actuating element portion 156, and at their other ends each plunger carries an enlarged abutment head 173 which normally engages the bar 138 in the manner illustrated in Figures 7 and 8 of the drawings. Each abutment head has a threaded bore and adjustably receives a tappet screw 174 for engaging the respective tappet 170. See Figures 1, 7 and 8.

A foil web 175 passes through the angularly disposed slot 144 from a supply reel 176 to a scrap take-up roll 177. The reel 176 is supported on a bracket 178 secured to the housing 26, and in passing from this reel toward the slotway 144, the web passes over an idler pulley 179 mounted in a bracket 180 secured to the housing 26, and over a tightener pulley 181 disposed between the idler 179 and the reel in a stirrup 182 pivotally supported in the bracket 180 and constantly urged against the web by a coil spring 183.

The housing 26 includes a removably mounted head plate 184 having a bearing hub 185 projecting upwardly at an angle therefrom and aligned with a bearing hub 186 supported on a bearing web 187 extending upwardly from the head plate. The web includes a bearing hub 188 for a stub shaft 189 on which the scrap take-up reel 177 is mounted. See Figures 2 and 19.

The scrap take-up reel structure includes a reel hub portion 190 having rotary bearing as at 191 on the shaft 189. The shaft carries an adjustable abutment head 192 opposed to a friction head 193 splined on the shaft 189, a spring 194 being interposed between the heads 192 and 193 for urging the latter into frictional engagement with the reel hub portion 190. See Figure 20. A large gear 195 is secured upon the lower end of the shaft 189.

The web 187 also includes a U-shaped bracket portion 196 in the arms of which a foil feed roller 197 is rotatably mounted, as at 198. The roller 198 is opposed by a presser roller 199 mounted in the arms of a U-shaped carrier 200 constantly urged toward the roller 197 by a spring 201. The feed roller shaft 202 is extended at one end to receive a finger knob 203 so as to enable manual manipulation of the roller, and at its other end the shaft carries a ratchet wheel 204. An arm 205 is rockably supported on the shaft and carries a driver pawl 206 adjustably supported on the arm through the medium of an eccentrically mounted crank pin 207 through which adjustments of the movement imparted to the wheel 204 can be made.

The arm 205 is connected by a pitman 208 and strap 209 with an eccentric 210 secured upon a shaft 211 rotative in the bearings 185 and 186. At the lower end the shaft 211 carries a gear 212 which meshes with the gear 106, and at its upper end the shaft carries a driver pinion 213 which imparts rotation to the large gear 195. A stop pawl 214 engages the ratchet wheel 204 and is supported as at 215 upon the web 187. See Figures 2 and 27 through 29.

The housing 63 has a slideway 216 formed in the upper portion thereof which is closed by a removable cover plate 217. A presser member 218 is reciprocably mounted in the slideway and includes an arcuate presser sector 219 opposed to the rotor head 52 and substantially concentric with the axis thereof. A thrust bar 220 is slidably supported on the member 218 and includes a rack portion 221 engaged by a pinion portion 222 of the rocker shaft 91 rockably supported as at 93 in the housing 63 in the manner hereinbefore described. The bar 220 includes a downwardly projected lug 223 which is opposed to the adjacent end portion of the slide member 218 and which includes a bore 224 for freely receiving an abutment screw 225 adjustably threaded into the slide member 218 and carrying an abutment and jam nut equipment 226. The lug 223 also carries abutment screw equipments 226ª which are adjustably mounted in the lug and project for engagement with the slide member 218. It will be observed by reference to Figures 25 and 26 of the drawings that the screw equipments 225, 226, 226ª can be adjusted to provide a variable amount of lost motion between the slide lug 223 and the slide member 218 so that a desired portion only of the movement of the former will be applied to the latter. Such an adjustment is desirable because it is intended that the presser sector 219 shall have a short pressing stroke of approximately one-sixteenth of an inch. As the shaft 91 is rocked it will impart reciprocation to the slide member 220, and a portion only of this slide movement will be transmitted to the presser slide 218. By reason of the provision of these screw equipments it is also possible to vary the position of the stroke of the member 218, 219 so as to increase or diminish the amount of pressure applied against the crown caps.

The housing cover 217 includes an upstanding lug 227 to which the lower end 228 of any suitable crown cap feeding mechanism is secured. An example of such cap feed mechanism is to be found in my co-pending application for Letters Patent filed November 9, 1938, Serial Number 239,726.

Crown caps fed downwardly through the individual chutes of the cap feeding mechanism are intercepted by escapement pawls 229 normally held in the cap stack retaining position shown in Figure 21 by springs 230 anchored to the cover 217. Movement of the pawls 229 under the urge of the springs is limited by an adjustably and eccentrically mounted rod 231. By adjustment of the rod the positions of the pawls can be altered. The lower pawl fingers 232 normally hold the lowermost caps, but when these caps are forced downwardly by the carrier units in a manner hereinafter to be described, the lower fingers 232 are temporarily displaced and the upper fingers 233 move into position for intercepting the remainder of the cap stacks, the parts again assuming the normal position under the urge of the springs 230 after the lowermost caps have been removed. At its lower extremity, the presser sector 219 carries a distributer plate forming a continuation in curvature of the sector and including two short distributer fingers 234 and three long distributer fingers 235. These fingers determine the points of delivery of the spotted crown caps, and because of their length serve to deposit two of each battery of five caps at one point and the remaining three at a more distant point. See Figures 1, 25 and 26.

In order to assure removal of the spotted crown cap from the carrier units 72 as each battery of such units reaches the discharge station, a battery of strippers 236 is supported upon a bracket 237 mounted as at 238 on the housing 17 in the manner illustrated in Figures 1 and 4 of the drawings.

The spotted crown caps normally fall from the ends of the distributer fingers 234 and 235, in groups of twos and threes onto an endless take-off belt 239. Any caps which tend to stick to the carrier units 72 of the rotor head 52 are stripped off by the stripper fingers 236 and caused to fall onto the conveyor.

At its receiving end, the belt 239 passes over a pulley 240 on a shaft 241 rotatably supported as at 242 in the housing 63. The shaft extends beyond the housing 63 and is equipped with a sprocket 243 to which rotation is imparted by a chain 244 from a small sprocket 245 mounted on an end of the cam shaft 23 extended from the housing 17, as shown in Figures 3 and 26.

A bracket 246 is secured upon the housing 63 and includes a pair of bearing ears 247 in which a shaft 248 is rockably mounted. The bracket also includes bearing ears 249 between which a gas manifold supporting arm 250 is pivotally supported on a pin 251. The arm includes an upwardly turned portion which supports a manifold 252 including an angled arm 253 positioned directly over the uppermost face of the rotor head 52. The arm portion 253 carries five individual gas burners 254, one thereof being aligned with each carrier unit projecting from the particular rotor head face positioned uppermost.

A cam 255 is mounted on the shaft 248 and includes a crest portion 256 which engages the arm 252 as the shaft is rocked for the purpose of lifting or lowering the manifold for moving the burners into ineffective position or into close proximity with the then uppermost carrier unit 72 for the purpose of heating and rendering tacky the heat sensitive adhesive on the exposed faces of the spots carried by said units. A stop screw 257 adjustably mounted on the manifold is engageable with the housing 17 for limiting the movement of the burners toward the rotor head. Gas and air lines 258 for servicing the burners 254 are attached at 259 to the manifold 252, and each line includes a suitable control valve 260.

A handle bracket 261 is secured to the shaft 248, and a handle member 262 is pivoted as at 263 to said bracket and has a finger 264 projected therefrom and engageable with keeper notches on a holder bracket 265 secured as at 266 on the housing. A spring 267 urges the handle in a direction for retaining the finger and notch engagement for maintaining the manually adjusted positions of said handle.

At the end of the shaft 248 opposite that which carries the handle, a cam 268 is affixed in position for engaging a switch actuator pin equipment 269 mounted in an extension 270 of the bracket. The pin equipment 269 is manipulated by the cam 268 for actuating any suitable switch equipment 271 mounted upon a bracket 272 suitably supported on a portion of the machine frame and connected with a source of power and the machine driving motor 7. See Figures 1, 15 and 16.

When the handle 262 is moved to the lowermost position illustrated in Figure 1, the cam crest 256 is moved to permit a lowering of the burners to the effective position illustrated in Figure 1, and when the handle lever is moved to the opposite or upper position the cam crest engages the arms 250 and lifts the burners to the ineffective position so as to avoid burning of any spots carried by the uppermost units 72 on the rotor head. Each movement of the handle lever 262 downwardly to the position first stated will act through the cam 268 to move the switch actuating pin equipment 269 to actuate the switch and complete an electric circuit through the driving motor 7, whereas movement of the lever to the position for rendering the burners ineffective will simultaneously adjust the pin equipment 269 for breaking said electrical circuit and discontinuing operation of the machine.

Operation

Operation of the machine is initiated by lowering the handle lever 262 to the position illustrated in Figure 1 of the drawings, thereby lowering the burners 254 into effective position and actuating the switch to complete the electrical circuit necessary to energize the motor 7 and bring about operation of the various mechanisms of the machine.

The rotor head 52 will be indexed, station by station, about its axis for presenting the carrier units 72 projecting therefrom at the various stations, at one of which a formed spot will be pneumatically affixed to each unit, at another station of which the adhesive on the exposed faces of the carrier spots will be heated and rendered tacky, at another station of which the carrier units and the spots will engage a battery of crown caps for affixing the spots thereto, and at said applying or affixing station and a succeeding station of which pressure will be twice applied by movements of the presser element 218, 219, the completed caps later being discharged onto the take-off belt 239. See Figures 11 and 25.

As each battery of carrier units 72 is presented at the spot forming station as shown in Figure 1, the punch slide 127 moves forwardly toward the battery of carrier units. As a particular battery of carrier units 72 is brought into registry with the punches the die plate 143 is spaced away from said units. By initiation of movement of the slide 127 toward said units, the rods 140 will be caused to move with the bars 137, 138 to the extent permitted by the lost motion spacing 152, as shown in Figure 7 so as to engage the die plate with the units and permit the extreme ends of the valve sleeves 82 to enter the clearance bores 146 and assure perfect registry of the spots to be formed with said units. Upon continued movement of the slide the punch sleeves 165 will be moved from the position illustrated in Figure 9 to the position illustrated in Figure 10 for cutting spots 89 from the foil web 175. Just before completion of the advance movement of the slide 127 the lug 155 engages the screw 158 causing the plunger actuating portion 156 to force the plunger equipments 172 and 168 forwardly thereby actuating the stripper head 166 to strip the formed spots from the ends of the punches and apply them to the ends of the carrier units in the manner illustrated in Figure 10.

As the slide 127 starts its return movement, frictional engagement of the bar bores 139 with the rods 140 will move the rods to the extent permitted by the lost motion spacing 162 previously referred to which is sufficient to remove the die plate 143 from contact with the carrier units as illustrated in Figure 9. Continued return movement of the slide 127 will return the plunger equipments to their normal positions. The next indexing movement of the rotor head takes place after the die plate 143 has been moved away as described.

After each operation of the punches as above described, the ratchet and pawl equipments will function to impart a step movement to the foil web 175, and because of the peculiar angular position of this web successive angularly disposed lines of apertures formed by removal of the spots from the web will be staggered as illustrated in Figure 2 of the drawings so as to reduce to a minimum foil waste. The step-by-step feed movements of the foil are imparted by the roller 197. The take-up reel 177 is rotated slowly and continuously, and the movement of this reel is timed to take-up the strap without pulling on the scrap web in a manner likely to break it. Avoidance of breakage is further assured by reason of the provision of the friction head 193.

As has been previously stated the housing 26 and the whole punch, die, and foil mounting equipment are bodily movable toward and from proximity with the rotor head. Thus whenever it is desirable to work upon the punch unit or the carrier units they may be separated to render them readily accessible without disturbing the drive connections of the various parts or their timed relation.

As each battery of spots 89 arrives at the vertical station of the rotor head as indicated in Figures 1 and 4 of the drawings, the exposed adhesive bearing faces thereof are presented to the gas burners 254, and the heat fusible adhesive is rendered tacky. As the carrier units 72 approach the position of the lowermost crown caps supported in the supply chute equipment 228, they engage in these caps and draw them away from the supporting pawls 229 to the first pressure applying station as indicated at the right of Figure 11 of the drawings. Because of the fact that the casing sleeves 79 snugly fit within the crown caps 87 proper centering of the spots 89 is assured. At the spot forming and affixing station, and each of the three successive stations, the valve sleeves 82 are in their extended position uncovering the ports 86 and thereby causing air at atmospheric pressure to pneumatically affix the spots to the carrier units because of the suction condition or evacuation pertaining in the ducts 77, 76, 60, 59 and 41. It will be obvious by reference to Figures 12 and 14 of the drawings that this suction or atmospheric pressure spot holding condition pertains until the respective units reach the position illustrated at the right in Figure 11 at which time the valve sleeves 82 will be held retracted by the presser sector 219 against the urge of the springs 83 thereby closing the ducts 86. While the unit is in the position just stated, the presser sector 219 is moved in the direction of the arrow on Figure 11 to impart a spot affixing pressure to the assembled cap and spot unit. This pressure is applied while the rotor head is stationary and is relieved by a one-sixteenth of an inch outward movement of the presser sector prior to the next indexing of said head. This pressure application is effective at the two stations indicated at the right and lower right in Figure 11, and as the presser sector 219 moves outwardly each time pressure relief is occasioned, the springs 83 in the units 72 registered with the pressure duct 48, 49, 59, 60, will force the valve sleeves 82 outwardly to uncover the ducts 86 and direct an air blast against the central portion of the applied spots 89 so as to press down any central portions thereof which might tend to bulge out. This air blast is secondarily effective to overcome any tendency of the crown caps to stick to the carrier units 72.

It will be obvious by reference to Figures 11 and 22 of the drawings that two index steps are necessary to deliver the battery of five completed caps moved by each battery of carrier units 72. During the first indexing step two of the completed caps will fall off the short fingers 234, and during the next step the three remaining completed caps will fall off the long fingers 235. The completed caps are thus deposited on the takeoff belt in staggered groups of twos and threes, thus making it possible to drive the belt at a slower speed and thereby facilitate perfect inspection of the completed caps.

Although carrier elements having provision for pneumatically holding the spots are shown installed in the main assembly views, it is to be understood that the invention is by no means limited to the use of such elements. In Figures 30 and 31 of the drawings I have disclosed a form of spot carrier element in which provision is made for mechanically, instead of pneumatically, holding the spots. These elements may be readily substituted for the elements hereinbefore described and generally designated 72.

The elements of Figures 30 and 31 each comprises a shank or main body member 273 having a reduced and externally threaded inner or mounting stem portion 274 and an enlarged outer or presser head portion 275 providing an inwardly directed abutment shoulder 276. A cylindrical casing 277 is pin secured to the member 273 as at 278 and is cored out to provide a spring chamber 279.

The annular spring chamber also slidably receives a cylindriform spot holding and centering sleeve 280, and the spring 281 mounted in the spring chamber and abutting at its respective ends with the casing and the sleeve, serves to yieldably hold the sleeve projected slightly beyond the end of the member 273 with the shoulder portion 282 of the sleeve abutting the shoulder 276 of the said member.

With the sleeve 280 thus yieldably projected beyond the member head 275, a cup-like spot receiving pocket is formed at the outer extremity of the element, and in order to mechanically or frictionally retain spots 89 pressed into the pocket by the spot forming equipment parts, the inner face of the sleeve 280 is provided with suitable spot gripping ribs. The inner face of the sleeve is recessed as at 283 and provided with securing sockets 284 to receive inserts 285 and their mounting lugs 286 so as to present the gripping ribs 287 borne by said inserts in position for biting into and gripping edge portions of spots 89 presented to the pocket. Suction breaking or air relief notches 288 also are provided in the outer extremity of the sleeve 280.

With this form of spot carrier element substituted for the pneumatic elements previously described, the air control features can be done away with and a simplified assembly may thus be provided. Punch formed spots will be pushed into the cup-like carrier element pockets by the stripper plungers 167 hereinbefore described and will be frictionally held therein by the ribs 287. With the spots thus held in place the rotor head conveys them to the heating station and thence past the end of the crown cap feeding chutes where the centering sleeves 280 engage in and pick up the crown caps as hereinbefore described. As the pressure slide 218, 219 pushes the caps against the element ends, the sleeves 280 recede and the member heads 275 firmly press the centered and tacky spots against the cap pads.

It will be obvious that the elements of Figure 30 are mounted on and project from the rotor head 52 in the same manner as the elements hereinbefore described and generally designated 72.

It is of course to be understood that the details of structure and arrangement of parts may be variously changed and modified without departing from the spirit and scope of my invention.

I claim:

1. In a machine of the character described, a multi-faced rotor head, spot carrier elements disposed with their axes projecting radially from the respective faces of the head, means for indexing the head to present the elements at successive stations, means at one station for forming and applying spots to said elements, and means for positioning and guiding crown caps in the path of movement of the radially projected spot bearing elements so that they will be entered by and fed along with said elements, said last-named means including individual cap feeding chutes disposed tangentially with relation to the path of indexing movement of the projected ends of the carrier elements, and yieldable pawl means for normally retaining the caps in the chutes.

2. In a machine of the character described, a multi-faced rotor head, spot carrier elements projecting from the respective faces of the head, means for indexing the head to present the elements at successive stations, means at one station for forming and applying spots to said elements with heat fusible adhesive bearing surfaces exposed, means for applying heat to render said surfaces tacky, means for bringing about engagement of crown caps and the element borne tacky spots, a presser segment disposed in position for opposing the projected ends of carrier elements, means for pressing the segment toward the head for forcing caps and elements into mutual contact to affix the interposed spots to said caps, a spotted cap take off conveyor disposed beneath said rotor, and spotted cap guiding and delivering means supported on and forming a continuation of said segment and terminating in a long discharge portion and a shorter discharge portion extended a lesser distance about the rotor than the first mentioned portion, both said portions being disposed over the conveyor so as to deposit spotted caps onto said conveyor in two distinct rows.

3. In a machine of the character described, a multi-faced rotor head, spot carrier elements projecting from the respective faces of the head, means for indexing the head to present the elements at successive stations, means at one station for forming and applying spots to said elements with heat fusible adhesive bearing surfaces exposed, means for applying heat to render said surfaces tacky, means for bringing about engagement of crown caps and the element borne tacky spots, a presser segment extending concentrically about the rotor over a plurality of station positions, and means driven in timed relation with the indexing means for moving the segment toward and from the rotor during stationary conditions thereof for alternately applying and relieving pressure contacts between the elements and crown caps for affixing the spots to the latter, said segment moving means including a thrust bar extending from said segment, a reciprocable rack bar having a lost motion connection with said thrust bar, and a rock shaft having a pinion portion engaging the rack bar for imparting reciprocation thereto.

4. A spot carrying and pressing element for crown cap spotting machines comprising, a central supporting body having a spot opposing end, a shell portion surrounding the body and forming an annular space thereabout, a spot presser sleeve in said space, spring means yieldably projecting the presser sleeve slightly beyond said body, and duct equipment in said body and said sleeve which when evacuated will cause spots to be affixed to said element by atmospheric pressure externally applied.

5. A spot carrying and pressing element for crown cap spotting machines comprising, a central supporting body having a spot opposing end, a shell portion surrounding the body and forming an annular space thereabout, a spot presser sleeve in said space, spring means yieldably projecting the presser sleeve slightly beyond said body, and duct equipment in said body and said sleeve which when evacuated will cause spots to be affixed to said element by atmospheric pressure externally applied, said shell portion including a cylindriform end engageable in crown caps for determining the centering of spots therein.

6. A spot carrying and pressing element for crown cap spotting machines comprising, a central supporting body having a spot opposing end, a shell portion surrounding the body and forming an annular space thereabout, a spot presser sleeve in said space, spring means yieldably projecting the presser sleeve slightly beyond said body, said shell portion including a cylindriform end engageable in crown caps for determining the centering of spots therein, said sleeve including a valve duct formed annularly in its body opposing face just inwardly of its projected end, and duct equipment extending through the body and communicating with the annular sleeve duct in such manner that communication through said ducts will be effected when the sleeve is projected beyond the body end and closed off when the sleeve is pressed inwardly.

7. In a machine of the character described, a multi-faced rotor head, spot carrier elements projecting from the respective faces of the head, indexing means for presenting the head faces at successive stations and including a shaft on which the head is mounted, and means for adjusting the head about the axis of and relative to the shaft for altering the direction of projection of the elements, said last named means including a member secured to the shaft, a member secured to the head, and screw means carried by one said member and adjustably abutting the other member.

8. In a machine of the character described, a multi-faced rotor head, a plurality of spot carrying elements projecting from each face of the head, each element including a central supporting body having a spot opposing end, a shell portion surrounding the body and forming an annular space thereabout, a spot presser sleeve in said space, spring means yieldably projecting the presser sleeve slightly beyond said body, said shell portion including a cylindriform end engageable in crown caps for determining the centering of spots therein, said sleeve including a valve duct formed annularly in its body opposing face just inwardly of its projected end, duct equipment extending through the body and communicating with the annular sleeve duct in such manner that communication through said ducts will be effected when the sleeve is projected beyond the body end and closed off when the sleeve is pressed inwardly, individual group duct equipments in the head each common to the elements of one head face and each opening through an end of the head, and a stationary valve ring engaging the end of the head and having an evacuated duct for communicating at times with said group duct equipments for creating a spot holding negative pressure condition in said elements.

9. In a machine of the character described, a multi-faced rotor head, a plurality of spot carrying elements projecting from each face of the head, each element including a central supporting body having a spot opposing end, a shell portion surrounding the body and forming an annular space thereabout, a spot presser sleeve in said space, spring means yieldably projecting the presser sleeve slightly beyond said body, said shell portion including a cylindriform end engageable in crown caps for determining the centering of spots therein, said sleeve including a valve duct formed annularly in its body opposing face just inwardly of its projected end, duct equipment extending through the body and communicating with the annular sleeve duct in such manner that communication through said ducts will be effected when the sleeve is projected beyond the body end and closed off when the sleeve is pressed inwardly, individual group duct equipments in the head each common to the elements of one head face and each opening through an end of the head, and a stationary valve ring engaging the end of the head and having an evacuated duct for communicating at times with said group duct equipments for creating a spot holding negative pressure condition in said elements and a pressure duct for communicating at times with said group duct equipments for directing blasts of air at a pressure greater than atmospheric pressure through said elements.

10. In a machine of the character described, a multi-faced rotor head rotatable about a horizontal axis, spot carrier elements projecting from the respective faces of the head, means for indexing the head to present the elements at successive stations, means at one station for forming and applying spots to said elements, means at another station for presenting crown caps for engagement with said elements, spot heating means disposed intermediate said stations, manually operable means for lifting and lowering said heating means from and to effective and ineffective positions, electric motor operated means for driving the indexing means and the spot forming means, a control switch connected in the motor circuit, and means actuated by movement of said manually operable means to break or complete the circuit accordingly as said heating means is lifted or lowered.

11. A spot carrying and pressing element for crown cap spotting machines comprising a central supporting member having a spot opposing end, a shell portion surrounding the member and forming an annular space thereabout, a sleeve mounted in said space, and spring means yieldably projecting the sleeve beyond said member thereby to form a cup-like spot receiving pocket.

12. A spot carrying and pressing element for crown cap spotting machines comprising a central supporting member having a spot opposing end, a shell portion surrounding the member and forming an annular space thereabout, a sleeve mounted in said space, and spring means yieldably projecting the sleeve beyond said member thereby to form a cup-like spot receiving pocket, said member and said sleeve having abutment shoulder portions engageable to determine the depth of said pocket.

13. A spot carrying and pressing element for crown cap spotting machines comprising, a central supporting member having a spot opposing end, a shell portion surrounding the member and forming an annular space thereabout, a sleeve mounted in said space, and spring means yieldably projecting the sleeve beyond said member thereby to form a cup-like spot receiving pocket, said sleeve having suction relieving notches in the portion thereof projected beyond said member.

14. A spot carrying and pressing element for crown cap spotting machines comprising a central supporting member having a spot opposing end, a shell portion surrounding the member and forming an annular space thereabout, a sleeve mounted in said space, and spring means yieldably projecting the sleeve beyond said member thereby to form a cup-like spot receiving pocket and ribs in the projected portion of said sleeve for engaging and frictionally holding spots in said pocket.

15. A spot carrying and pressing element for crown cap spotting machines comprising, a central supporting member having a spot opposing end, a shell portion surrounding the member and forming an annular space thereabout, a sleeve mounted in said space, and spring means yieldably projecting the sleeve beyond said member thereby to form a cup-like spot receiving pocket, said sleeve having suction relieving notches in the portion thereof projected beyond said member and ribs in the projected portion of said sleeve for engaging and frictionally holding spots in said pocket.

16. In a machine of the character described, a multi-faced rotor head, spot carrier units disposed with their axes projecting radially from the respective faces of the head, means for indexing the head to present the units at successive stations, means at one station for forming and applying spots to said units, and means for positioning and guiding crown caps in the path of movement of the radially projected spot bearings units so that they will be entered by and fed along with said units, said units including cylindriform portions larger in diameter than the size of the spots and of diameters for snugly fitting within the caps so as to center the spots therein and to the ends of which the spots bear centered relation.

17. In a machine of the character described, a multi-faced rotor head, spot carrier units disposed with their axes projecting radially from the respective faces of the head, means for indexing the head to present the units at successive stations, means at one station for forming spots and engaging them with said units, and means for positioning and guiding crown caps in the path of movement of the radially projected spot engaging units so that they will be entered by and fed along with said units, said units including cylindriform portions larger in diameter than the size of the spots and of diameters for snugly fitting within the caps so as to center the spots therein and to the ends of which the spots bear centered relation, and said carrier units including duct equipments, means for controlling evacuation of the ducts to cause spots to adhere thereto by atmospheric pressure externally applied, and control means for directing air blasts at a pressure greater than atmospheric pressure through said ducts upon cap engaging spots to press them against said caps.

18. In a machine of the character described, a multi-faced rotor head, spot carrier elements disposed with their axes projecting radially from the respective faces of the head, means for indexing the head to present the elements at successive stations, means at one station for forming and applying spots to said elements with heat fusible adhesive bearing surfaces exposed, means for applying heat directly to the adhesive bearing surfaces to render said surfaces tacky, means for bringing about engagement of crown caps and the element borne tacky spots, a pressure segment disposed in definite relation to said rotor head and in position for simultaneously opposing the projected ends of a plurality of the indexed carrier elements, and means for pressing the segment toward the head for forcing caps and elements into mutual contact to affix the interposed spots to said caps.

19. In a machine of the character described, a multi-faced rotor head, spot carrier elements disposed with their axes projecting radially from the respective faces of the head, means for indexing the head to present the elements at successive stations, means at one station for forming and applying spots to said elements with heat fusible adhesive bearing surfaces exposed, means for applying heat directly to the adhesive bearing surfaces to render said surfaces tacky, means for bringing about engagement of crown caps and the element borne tacky spots, a presser segment disposed in definite relation to said rotor head and extending concentrically about the rotor over a plurality of station positions, and means for reciprocating the segment for alternately applying and relieving pressure on caps by means of said segment at successive stations for forcing caps and elements into mutaul spot affixing contact.

20. In a machine of the character described, a multi-faced rotor head, spot carrier elements disposed with their axes projecting radially from the respective faces of the head, means for indexing the head to present the elements at successive stations, means at one station for forming and applying spots to said elements with heat fusible adhesive bearing surfaces exposed, means for applying heat directly to the adhesive bearing surfaces to render said surfaces tacky, means for bringing about engagement of crown caps and the element borne tacky spots, a presser segment disposed in definite relation to said rotor head and extending concentrically about the rotor over a plurality of station positions, means for reciprocating the segment for alternately applying and relieving pressure on caps by means of said segment at successive stations for forcing caps and elements into mutual spot affixing contact, and means effective during a pressure relieving retraction of said segment for directing a blast of air at a pressure greater than atmospheric pressure onto cap engaging spots to press them against said caps.

21. In a machine of the character described, a multi-faced rotor head, spot carrier elements disposed with their axes projecting radially from the respective faces of the head, means for indexing the head to present the elements at successive stations, means at one station for forming and applying spots to said elements with heat fusible adhesive bearing surfaces exposed, means for applying heat directly to the adhesive bearing surfaces to render said surfaces tacky, means for bringing about engagement of crown caps and the element borne tacky spots, a presser segment disposed in definite relation to said rotor head and extending concentrically about the rotor over a plurality of station positions, means for reciprocating the segment for alternately applying and relieving pressure on caps by means of said segment at successive stations for forcing caps and elements into mutual spot affixing contact, said carrier elements including duct equipments, means for controlling evacuation of the ducts to cause spots to adhere thereto by atmospheric pressure externally applied from the spot forming station through the heating stage and until said segment is encountered, and means effective during a pressure relieving retraction of said segment for directing a blast of air at a pressure greater than atmospheric pressure through said duct equipments to press the spots against the caps and overcome tendencies of the caps to adhere to said carrier elements.

22. In a machine of the character described, a rotor rotatable about a horizontal axis and having spot carrier elements projected from the periphery thereof with their axes disposed radially and in rows, means for attaching spots to the ends of the carrier elements, means for bringing about contact between crown caps and the carrier element borne spots for attaching said spots to said caps, a spotted cap take off conveyor disposed beneath the rotor, and spotted cap guiding and delivering means disposed substantially concentric with said rotor and terminating in a long discharge portion and a shorter discharge portion extended a lesser distance about the rotor than said first mentioned portion, both said portions being disposed over the conveyor so as to deposit spotted caps onto said conveyor in two distinct rows.

23. In a machine of the character described, a multi-faced rotor head, spot carrier elements disposed with their axes projecting radially from the respective faces of the head, means for indexing the head to present the elements at successive stations, means at one station for forming and applying spots to said elements with heat fusible adhesive bearing surfaces exposed, means for applying heat to render said surfaces tacky, means for bringing about engagement of crown caps and the element borne tacky spots, a presser segment disposed in definite relation to said rotor head and extending concentrically about the rotor over a plurality of station positions, and means driven in timed relation with the indexing means for moving the segment toward and from the rotor during stationary conditions thereof for alternately applying and relieving pressure contacts between the elements and crown caps for affixing the spots to the latter.

24. In a machine of the character described, a multi-faced rotor head, spot carrier elements disposed with their axes projecting radially from the respective faces of the head, indexing means for presenting the head faces at successive stations and including a shaft on which the head is mounted, reciprocable spot punching means disposed for alignment with the elements at one station, and means for adjusting the head about the axis of and relative to the shaft for alternating the direction of projection of the elements for the purpose of obtaining proper alignment of the elements with the punching means.

25. In a machine of the character described, a spot forming station, a spot applying station, a head rotatable about a horizontal axis and having a plurality of rows of spot carrier units, the units of each row being disposed with their axes projecting radially from said head, means for temporarily holding a spot centered on the exposed end of each unit, means for punch-forming and directly presenting heat fusible adhesive bearing spots to the units at the forming station, means for stationarily supporting crown caps at the spot applying station in position to be entered by the spot holding ends of successively presented rows of the units as they are moving into the spot applying station, and means for directly applying heat to the exposed adhesive bearing faces of the spots held on said units while moving toward the spot applying station.

26. In a machine of the character described, a spot forming station, a spot applying station, a head rotatable about a horizontal axis and having a plurality of rows of spot carrier units, the units of each row being disposed with their axes projecting radially from said head, means for temporarily holding a spot centered on the exposed end of each unit, means for punch-forming and directly presenting heat fusible adhesive bearing spots to the units at the forming station, means for stationarily supporting crown caps at the spot applying station in position to be entered by the spot holding ends of successively presented rows of the units as they are moving into the spot applying station, means for directly applying heat to the exposed adhesive bearing faces of the spots held on said units while moving toward the spot applying station, means for indexing the head from station to station to present each row of units for an interval at each of the spot forming and spot applying stations, and means for forcing caps against the spot holding unit ends therein at the spot applying station to firmly fix adhesion of the spots to the caps.

27. In a machine of the character described, a spot forming station, a spot applying station, a head rotatable about a horizontal axis and having a plurality of rows of spot carrier units, the units of each row being disposed with their axes projecting radially from said head, means for temporarily holding a spot centered on the exposed end of each unit, means for punch-forming and directly presenting heat fusible adhesive bearing spots to the units at the forming station, means for stationarily supporting crown caps at the spot applying station in position to be entered by the spot holding ends of successively presented rows of the units as they are moving into the spot applying station, means for directly applying heat to the exposed adhesive bearing faces of the spots held on said units while moving toward the spot applying station, means for indexing the head from station to station to present each row of units for an interval at each of the spot forming and spot applying stations, and means opposed to the outer ends of the travelling units at and adjacent the spot applying station for guiding the unit engaged caps and causing them to be fed away from the spot applying station by said units.

28. In a machine of the character described, a spot forming station, a spot applying station, a head rotatable about a horizontal axis and having a plurality of rows of spot carrier units, the units of each row being disposed with their axes projecting radially from said head, means for temporarily holding a spot centered on the exposed end of each unit, means for punch-forming and directly presenting heat fusible adhesive bearing spots to the units at the forming station, means for stationarily supporting crown caps at the spot applying station in position to be entered by the spot holding ends of successively presented rows of the units as they are moving into the spot applying station, means for directly applying heat to the exposed adhesive bearing faces of the spots held on said units while moving toward the spot applying station, means for indexing the head from station to station to present each row of units for an interval at each of the spot forming and spot applying stations, means opposed to the outer ends of the travelling units at and adjacent the spot applying station for guiding the unit engaged caps and causing them to be fed away from the spot applying station by said units, and means for imparting movement to said guide means for forcing caps against the units to firmly fix adhesion of the spots to said caps.

29. In a machine of the character described, a generally cylindriform rotor rotatable about a fixed axis, rows of generally cylindriform spot carrier elements disposed in equidistantly spaced relation about the circumference of said rotor, each said row comprising a plurality of said elements all extending like definite distances from the rotor with their axes projected radially in a common plane and in parallel equidistantly spaced relation, means for indexing the rotor to present the element rows at successive stations including a spot forming station and a spotted cap discharging station, means at the spot forming station for forming and applying spots to the elements of successively presented rows, and means disposed in advance of said discharging station for stationarily and successively presenting rows of crown caps, each row of caps as presented bearing tangential relation to the circular path of movement of the radially extended extremities of said elements so that said radially extended extremities of the elements of each row of said elements in moving toward said discharge station will move into a row of caps, press the spots affixed on said radially extended extremities into said caps, and then move on toward said discharge station with the spotted caps moving therewith.

30. In a machine of the character described, a generally cylindriform rotor rotatable about a fixed axis, rows of generally cylindriform spot carrier elements disposed in equidistantly spaced relation about the circumference of said rotor, each said row comprising a plurality of said elements all extending like definite distances from the rotor with their axes projected radially in a common plane and in parallel equidistantly spaced relation, means for moving the rotor to present the element rows at a spot receiving station and a spotted cap discharging station, means for effecting attachment of spots in centered relation on the ends of the elements at said receiving station, means disposed in advance of said discharging station for stationarily and successively presenting rows of caps each row of caps as presented bearing tangential relation to the circular path of movement of the radially extended extremities of said elements so that said radially extended extremities of the elements of each row of said elements in moving toward said discharge station will move into a row of caps, press the spots attached on said radially extended extremities into said caps, and then move on toward said discharge station with the spotted caps moving therewith, and means for directing a blast of air under pressure greater than atmospheric pressure through each said element onto the spots being pressed thereby into said caps for aiding in the pressure attachment of said spots to said caps.

31. In a machine of the character described, a generally cylindriform rotor rotatable about a fixed axis, rows of generally cylindriform spot carrier elements disposed in equidistantly spaced relation about the circumference of said rotor, each said row comprising a plurality of said elements all extending like definite distances from the rotor with their axes projected radially in a common plane and in parallel equidistantly spaced relation, individual air ducts extending through the elements, individual air ducts in the head communicating with groups of said elements and opening at spaced intervals through an end of the rotor head, and a stationary valve ring engaging said end and having a negative pressure air duct therein and a greater than atmospheric air pressure duct therein, said head ducts and said valve ring ducts being spaced like distances from the rotor head axis so that they will communicate at different times during each rotation of the rotor head for creating negative or positive pressure conditions in said elements accordingly as one or the other of said ring ducts communicate with said head ducts.

32. In a machine of the character described, a generally cylindriform rotor rotatable about a fixed axis, rows of generally cylindriform spot carrier elements disposed in quidistantly spaced relation about the circumference of said rotor, each said row comprising a plurality of said elements all extending like definite distances from the rotor with their axes projected radially in a common plane and in parallel equidistantly spaced relation, means for moving the rotor to present the element rows at a spot receiving station and a spotted cap discharging station, means for effecting attachment of spots in centered relation on the ends of the elements at said receiving station, means disposed in advance of said discharging station for stationarily and successively presenting rows of caps each row of caps as presented bearing tangential relation to the circular path of movement of the radially extended extremities of said elements so that said radially extended extremities of the elements of each row of said elements in moving toward said discharge station will move into a row of caps, press the spots attached on said radially extended extremities into said caps, and then move on toward said discharge station with the spotted caps moving therewith, each said carrier element including a cylindriform end portion at its radially extended extremity and of a diameter for snugly fitting within an engaged crown cap, and a smaller diameter portion to which said spots are attached and centered within said cylindriform end portion so as to effect a perfect centering of an attached spot within said engaged cap.

33. In a machine of the character described, a generally cylindriform rotor rotatable about a fixed axis, rows of generally cylindriform spot carrier elements disposed in equidistantly spaced relation about the circumference of said rotor, each said row comprising a plurality of said elements all extending like definite distances from the rotor with their axes projected radially in a common plane and in parallel equidistantly spaced relation, means for moving the rotor to present the element rows at a spot receiving station and a spotted cap discharging station, means for effecting attachment of spots in centered relation on the ends of the elements at said receiving station, means disposed in advance of said discharging station for stationarily and successively presenting rows of caps each row of caps as presented bearing tangential relation to the circular path of movement of the radially extended extremities of said elements so that said radially extended extremities of the elements of each row of said elements in moving toward said discharge station will move into a row of caps, press the spots attached on said radially extended extremities into said caps, and then move on toward said discharge station with the spotted caps moving therewith, and means for directing a blast of air under pressure greater than atmospheric pressure through each said element onto the spots being pressed thereby into said caps for aiding in the pressure attachment of said spots to said caps, each said carrier element including a cylindriform end portion at its radially extended extremity and of a diameter for snugly fitting within an engaged crown cap and a smaller diameter portion to which said spots are attached and centered within said cylindriform end portion so as to effect a perfect centering of an attached spot within said engaged cap.

34. In a machine of the character described, a generally cylindriform rotor rotatable about a fixed axis, rows of generally cylindriform spot carrier elements disposed in equidistantly spaced relation about the circumference of said rotor, each said row comprising a plurality of said elements all extending like definite distances from the rotor with their axes projected radially in a common plane and in parallel equidistantly spaced relation, means for moving the rotor to present the element rows at a spot receiving station and a spotted cap discharging station, means disposed in advance of said discharging station for stationarily and successively presenting rows of caps each row of caps as presented bearing tangential relation to the circular path of movement of the radially extended extremities of said elements so that said radially extended extremities of the elements of each row of said elements in moving toward said discharge station will move into a row of caps, press the spots attached on said radially extended extremities into said caps, and then move on toward said discharge station with the spotted caps moving therewith, each said carrier element including a cylindriform end portion at its radially extended extremity and of a diameter for snugly fitting within an engaged crown cap and a smaller diameter portion to which said spots are attached and centered within said cylindriform end portion so as to effect a perfect centering of an attached spot within said engaged cap, each said carrier element including duct equipment, means for controlling evacuation of the duct equipments to cause spots to be pneumatically attached to said elements at said receiving station, and control means for directing a blast of air under pressure greater than atmospheric pressure through each said element onto the spots being pressed thereby into said caps for aiding in the pressure attachment of said spots to said caps.

35. In a machine of the character described, a generally cylindriform rotor rotatable about a fixed axis, rows of generally cylindriform spot carrier elements disposed in equidistantly spaced relation about the circumference of said rotor, each said row comprising a plurality of said elements all extending like distances from the rotor with their axes projected radially in a common plane and in parallel equidistantly spaced relation, means for indexing the rotor to present the element rows at successive stations including a spot forming station, a spotted cap discharging station and an intermediately disposed spot affixing station, means at the spot forming station for forming and applying spots to the elements of successively presented rows, means for presenting a row of crown caps in registry with each row of the elements as they are presented at the spot affixing station, and means for pressing the successively presented rows of caps against the successively presented rows of spot bearing elements to affix the spots to the caps.

PAUL E. PEARSON.